(12) United States Patent
Vaisanen et al.

(10) Patent No.: US 12,252,212 B2
(45) Date of Patent: Mar. 18, 2025

(54) METHODS OF OPERATING AN ELECTRIC VEHICLE AND ELECTRIC SNOWMOBILE

(71) Applicant: BOMBARDIER RECREATIONAL PRODUCTS INC., Valcourt (CA)

(72) Inventors: Esa Vaisanen, Rovaniemi (FI); Ioannis Soultanis, Vantaa (FI); Jukka Keranen, Rovaniemi (FI); Ashley Sharp, Helsinki (FI)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 224 days.

(21) Appl. No.: 17/773,408

(22) PCT Filed: Nov. 2, 2020

(86) PCT No.: PCT/IB2020/060274
§ 371 (c)(1),
(2) Date: Apr. 29, 2022

(87) PCT Pub. No.: WO2021/084520
PCT Pub. Date: May 6, 2021

(65) Prior Publication Data
US 2022/0411018 A1     Dec. 29, 2022

Related U.S. Application Data

(60) Provisional application No. 62/928,603, filed on Oct. 31, 2019.

(51) Int. Cl.
*B62M 27/02* (2006.01)
*B62K 23/04* (2006.01)

(52) U.S. Cl.
CPC .............. *B62M 27/02* (2013.01); *B62K 23/04* (2013.01); *B62K 2204/00* (2013.01)

(58) Field of Classification Search
CPC ........... B62M 27/02; B60W 30/18036; B60W 30/18063; B60W 10/08; B62K 23/04;
(Continued)

(56) References Cited

U.S. PATENT DOCUMENTS

| 10,392,079 B2 | 8/2019 | Vezina et al. |
| 10,450,968 B2 | 10/2019 | Bernier et al. |

(Continued)

FOREIGN PATENT DOCUMENTS

| GB | 2390837 B | 1/2006 |
| JP | 2007182137 A | 7/2007 |

(Continued)

OTHER PUBLICATIONS

International Search Report of PCT/IB2020/060274; Blaine R. Copenheaver; May 7, 2021.
(Continued)

*Primary Examiner* — Lori Wu
(74) *Attorney, Agent, or Firm* — BCF LLP

(57) ABSTRACT

A method for operating an electric vehicle has the steps of: determining if at least one of a speed of the vehicle and a speed of an electric motor of the vehicle is zero; in response to the at least one of the speed being zero, determining if a reverse actuator is actuated; in response to the reverse actuator being actuated, starting a timer, then determining if the reverse actuator has been actuated without interruption for a predetermined amount of time; in response to the reverse actuator having been actuated without interruption for the predetermined amount of time, changing an operation mode of the electric motor from one of a forward mode and a reverse mode to another of the forward mode and the reverse mode. An electric snowmobile and other methods for operating an electric vehicle are disclosed.

11 Claims, 17 Drawing Sheets

(58) Field of Classification Search
CPC ...... B62K 23/02; B62K 2204/00; B62J 43/28; B62J 43/10; B60L 15/20; B60L 15/2009; B60L 15/2072; B60L 2200/22; B60L 2200/26; B60L 2240/12; B60L 2240/32; B60L 50/60
See application file for complete search history.

(56) References Cited

U.S. PATENT DOCUMENTS

| | | | |
|---|---|---|---|
| 10,596,986 B2 | 3/2020 | Lecointre et al. | |
| 2003/0094912 A1* | 5/2003 | Wakitani | B60L 15/2054 318/55 |
| 2003/0236121 A1* | 12/2003 | Byers | A63H 17/26 463/62 |
| 2006/0030979 A1 | 2/2006 | Kuang et al. | |
| 2010/0125019 A1 | 5/2010 | Tabata et al. | |
| 2011/0042158 A1* | 2/2011 | Portelance | B62K 5/05 180/218 |
| 2012/0203407 A1 | 8/2012 | Hatanaka et al. | |
| 2013/0090800 A1 | 4/2013 | Nakamura et al. | |
| 2013/0282218 A1 | 10/2013 | Matsuda et al. | |
| 2016/0075404 A1 | 3/2016 | Haaf et al. | |

FOREIGN PATENT DOCUMENTS

| | | |
|---|---|---|
| WO | 2018167859 A1 | 7/2018 |
| WO | 2018215693 A1 | 11/2018 |
| WO | 2019049109 A1 | 3/2019 |

OTHER PUBLICATIONS

Goldstein et al., Wendigo 2014—An Arctic and Antarctic Snowmobile, Mar. 6, 2014, retrieved from http://www.mtukrc.org/download/mcgill/mcgill_ze_oral_presentation_2014.pptx on Apr. 29, 2022.

Fuchs et al., Innovations for a Greener Tomorrow: Michigan Tech's E-Rush, 2013, retrieved from http://www.mtukrc.org/download/mtu/mtu_ze_design_paper_2013.pdf on Apr. 29, 2022.

* cited by examiner

METHODS OF OPERATING AN ELECTRIC VEHICLE AND ELECTRIC SNOWMOBILE

CROSS-REFERENCE

The present application claims priority to U.S. Provisional Patent Application No. 62/928,603, filed Oct. 31, 2019, the entirety of which is incorporated herein by reference.

FIELD OF TECHNOLOGY

The present technology relates to methods of operating electric vehicles and electric snowmobile.

BACKGROUND

An increasing number of vehicles, such as cars, are now powered by electric motors instead of internal combustion engines. In order to power the electric motor, a number of batteries need to be provided in the vehicle. In addition to the type of batteries being used, the number of batteries being provided has a direct impact on the driving range of the vehicle before recharging of the batteries is required.

In recreational vehicles, such as snowmobiles and all-terrain vehicles, the amount of space available for the batteries and the other components of the electrical system is very limited. Additionally, snowmobiles have to operate on snow and too much weight could cause the snowmobile to sink in the snow instead of floating on the snow.

Furthermore, some aspects of the operation of an electric vehicle, such as an electric snowmobile, present particular challenges that are not present in vehicles powered by an in internal combustion engine. For example, in most vehicles powered by an internal combustion engine, when the engine is operating, but the vehicle is at rest, the engine is idling and accordingly generates noise which the driver will recognize as an indication that the engine is operating. However, in an electric vehicle, when the electrical system is turned on, but the vehicle is at rest, the electric motor is stopped. As such, the electric motor does not generate noise which could lead to the driver being unsure as the whether or not the vehicle has been started. Also, under certain circumstances, such as when wanting to operate in reverse or when braking, it has been found that operating the electric motor in the same manner as would be done with an internal combustion engine could lead to certain issues.

There is therefore a desire for an electric snowmobile and for methods of operating electric vehicles.

SUMMARY

It is an object of the present technology to ameliorate at least some of the inconveniences present in the prior art.

According to one aspect of the present technology, there is provided a method for operating an electric vehicle comprising: determining if at least one of a speed of the vehicle and a speed of an electric motor of the vehicle is zero; in response to the at least one of the speed of the vehicle and the speed of the electric motor being zero, determining if a reverse actuator is actuated; in response to the reverse actuator being actuated, starting a timer; once the timer has started, determining if the reverse actuator has been actuated without interruption for a predetermined amount of time determined by the timer; in response to the reverse actuator having been actuated without interruption for the predetermined amount of time, changing an operation mode of the electric motor, the operation mode being one of a forward mode and a reverse mode, changing the operation mode of the electric motor comprising: changing from the forward mode to the reverse mode, in response to the motor being in the forward mode prior to reverse actuator being actuated; and changing from the reverse mode to the forward mode, in response to the motor being in the reverse mode prior to reverse actuator being actuated; after changing the operation mode, actuating an acceleration input device; and in response to actuating the acceleration input device, operating the electric motor in the operation mode.

In some embodiments of the present technology, the method further comprises: in response to the at least one of the speed of the vehicle and the speed of the electric motor being zero, and prior to determining if a reverse actuator is actuated: determining if the acceleration input device is actuated; and wherein determining if a reverses actuator is actuated is performed in response to the acceleration input device not being actuated.

In some embodiments of the present technology, the predetermined amount of time is a first predetermined amount of time. The method further comprise entering an idle mode in response to: the at least one of the speed of the vehicle and the speed of the electric motor being zero, the acceleration input device not being actuated, and the reverse actuator not being actuated, for a second predetermined amount of time, the second predetermined amount of time being greater than the first predetermined amount of time.

In some embodiments of the present technology, the reverse actuator is a button.

In some embodiments of the present technology, operating the electric motor in the operation mode in response to actuating the acceleration input device comprises: determining a position of the acceleration input device using a sensor; filtering a signal from the sensor to obtain a filtered signal; and operating the electric motor in the operation mode based on the filtered signal.

In some embodiments of the present technology, filtering the signal comprises using a digital filter to enable filtering of unintended variations in the position of the acceleration input device.

In some embodiments of the present technology, the at least one of the speed of the vehicle and the speed of the electric motor being zero is the speed of the electric motor being zero.

In some embodiments of the present technology, the reverse actuator is mounted to a first handle of a handlebar of the vehicle; and the acceleration input device is an acceleration lever mounted to a second handle of the handlebar of the vehicle.

According to another aspect of the present technology, there is provided a method for making an electric vehicle operate in reverse comprising: actuating a brake input device; actuating a reverse actuator; in response to the brake input device and the reverse actuator being actuated simultaneously, controlling an electric motor of the vehicle to be operable in a reverse mode; after actuating the reverse actuator, at least partially releasing the brake input device; after at least partially releasing the brake input device, actuating an acceleration input device; and in response to actuating the acceleration input device, operating the electric motor in the reverse mode.

In some embodiments of the present technology, at least partially releasing the brake input device comprises completely releasing the brake input device.

In some embodiments of the present technology, the method further comprises, after actuating the reverse actuator, releasing the reverse actuator.

In some embodiments of the present technology, the reverse actuator is a button.

In some embodiments of the present technology, the brake input device is a brake lever; the acceleration input device is an acceleration lever; actuating the brake input device includes actuating the brake lever mounted to a first handle of a handlebar of the vehicle; actuating the reverse actuator includes actuating the reverse actuator mounted to the first handle while the brake lever is actuated; and actuating the acceleration input device includes actuating the acceleration lever mounted to a second handle of the handlebar of the vehicle.

In some embodiments of the present technology, the reverse actuator and the brake lever are positioned such that actuating the reverse actuator while the brake lever is actuated can be achieved using a single hand.

According to another aspect of the present technology, there is provided a method for operating an electric vehicle comprising: actuating a start actuator; in response to the start actuator being actuated, starting a timer; once the timer has reached a predetermined amount of time: determining if at least one of a speed of the vehicle and a speed of an electric motor of the vehicle is zero; and determining if the acceleration input device is actuated; enabling operation of the electric motor in response to: the at least one of the speed of the vehicle and the speed of the electric motor being zero; and the acceleration input device not being actuated; operation of the electric motor not being enabled unless: the at least one of the speed of the vehicle and the speed of the electric motor is zero; and the acceleration input device is not actuated; in response to the operation of the electric motor being enabled, operating the electric motor in response to actuation of the acceleration input device.

In some embodiments of the present technology, operating the electric motor in response to actuation of the acceleration input device comprises: determining a position of the acceleration input device using a sensor; filtering a signal from the sensor to obtain a filtered signal; and operating the electric motor based on the filtered signal.

In some embodiments of the present technology, filtering the signal comprises using a digital filter to enable filtering of unintended variations in the position of the acceleration input device.

In some embodiments of the present technology, the at least one of the speed of the vehicle and the speed of the electric motor being zero is the speed of the electric motor being zero.

In some embodiments of the present technology, the start actuator is mounted to a handlebar of the vehicle; and the acceleration input device is an acceleration lever mounted to the handlebar of the vehicle.

According to another aspect of the present technology, there is provided a method for operating an electric vehicle comprising: actuating an acceleration input device; and in response to the acceleration input device being actuated: starting a timer; and operating an electric motor of the vehicle once the timer has reached a predetermined amount of time.

In some embodiments of the present technology, the method further comprises: determining at least one of a speed of the vehicle and a speed of the electric motor; in response to the at least one of the speed of the vehicle and the speed of the electric motor being zero, and in response to the acceleration input device being actuated: the timer is started; and the electric motor is operated once the timer has reached the predetermined amount of time; and in response to the at least one of the speed of the vehicle and the speed of the electric motor not being zero, and in response to the acceleration lever being actuated: operating the electric motor.

In some embodiments of the present technology, actuating the acceleration input device includes actuating an acceleration lever mounted to a handle of a handlebar of the vehicle.

According to another aspect of the present technology, there is provided a method for braking an electric vehicle comprising: actuating an acceleration input device; in response to the acceleration input device being actuated, and while a brake input device is not being actuated, operating an electric motor of the vehicle; actuating the brake lever input device while the acceleration input device is actuated; and in response to the brake input device and the acceleration input device being actuated simultaneously: interrupting operation of the electric motor; and actuating at least one brake of the vehicle.

In some embodiments of the present technology, actuating the at least one brake of the vehicle includes hydraulically actuating the at least one brake of the vehicle.

In some embodiments of the present technology, the acceleration input device is an acceleration lever mounted to a first handle of a handlebar of the vehicle; and the brake input device is a brake lever mounted to a second handle of the handlebar of the vehicle.

According to another aspect of the present technology, there is provided a snowmobile having: a frame, the frame including a tunnel; at least one ski operatively connected to the frame; a handlebar operatively connected to the at least one ski; a straddle seat disposed over the tunnel; a drive track disposed at least in part under the tunnel; a drive axle operatively connected to the drive track; at least one battery disposed on the tunnel and under the seat; an electric motor connected to the frame at a position laterally outward of the drive track, the electric motor being electrically connected to the at least one battery; an output shaft connected to the electric motor; and a mechanical drive operatively connecting the output shaft to the drive axle. The mechanical drive is disposed laterally between the drive track and the electric motor.

In some embodiments of the present technology, the mechanical drive is a flexible drive having a flexible element. The flexible element operatively connects the output shaft to the drive axle. The flexible element is disposed laterally between the drive track and the electric motor.

In some embodiments of the present technology, the flexible drive includes a drive sprocket disposed on the output shaft and a driven sprocket disposed on the drive axle. The flexible element is a drive belt looped around the drive and driven sprockets.

In some embodiments of the present technology, the driven sprocket has a larger diameter than the drive sprocket.

In some embodiments of the present technology, a longitudinal position of the electric motor is adjustable for adjusting a tension in the drive belt.

In some embodiments of the present technology, the output shaft is parallel to the drive axle.

In some embodiments of the present technology, the output shaft is disposed forward of the drive axle.

In some embodiments of the present technology, the output shaft is disposed upward of the drive axle.

In some embodiments of the present technology, at least one track drive sprocket is disposed on the drive axle and engages the drive track.

In some embodiments of the present technology, two footrests extend from sides of the tunnel. The electric motor is disposed forward of and is at least partially laterally aligned with one of the two footrests.

In some embodiments of the present technology, the at least one battery is at least one first battery. At least one second battery is disposed forward of the drive axle. The at least one second battery is electrically connected to the electric motor.

In some embodiments of the present technology, the at least one first battery is disposed rearward of the drive axle.

In some embodiments of the present technology, a battery control unit (BCU) is disposed longitudinally between the at least one first battery and the at least one second battery. The BCU electrically connects the at least one first battery and the at least one second battery to the electric motor.

In some embodiments of the present technology, a charging socket is electrically connected to the BCU. The charging socket is disposed forward of the seat.

In some embodiments of the present technology, the charging socket is disposed rearward of the handlebar.

In some embodiments of the present technology, the charging socket is disposed above the BCU.

In some embodiments of the present technology, the at least one first battery is a plurality of first batteries, and the at least one second battery is a plurality of second batteries.

In some embodiments of the present technology, the electric motor is disposed on a first lateral side of a longitudinal centerline of the snowmobile. The plurality of second batteries is laterally offset toward a second lateral side of the longitudinal centerline.

In some embodiments of the present technology, at least one battery of the plurality of second batteries is disposed completely on the second lateral side of the longitudinal centerline.

In some embodiments of the present technology, the plurality of first batteries is generally laterally centered relative to the longitudinal centerline of the snowmobile.

In some embodiments of the present technology, the plurality of first batteries and the plurality of second batteries include an equal number of batteries.

For purposes of the present application, terms related to spatial orientation when referring to a snowmobile and components in relation to the snowmobile, such as "vertical", "horizontal", "forward", "rearward", "left", "right", "above" and "below", are as they would be understood by a driver of the snowmobile sitting thereon in an upright driving position, with the snowmobile being at rest on a flat, level surface. Also for purposes of the present application, the term "brake input device" refers to any device such as, but not limited to, a brake lever and a brake pedal, which the driver can use to indicate that braking of the vehicle is desired and the term "acceleration input device" refers to any device such as, but not limited to, an acceleration lever, an acceleration twist grip and an acceleration pedal, which the driver can use to indicate that acceleration of the vehicle is desired Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
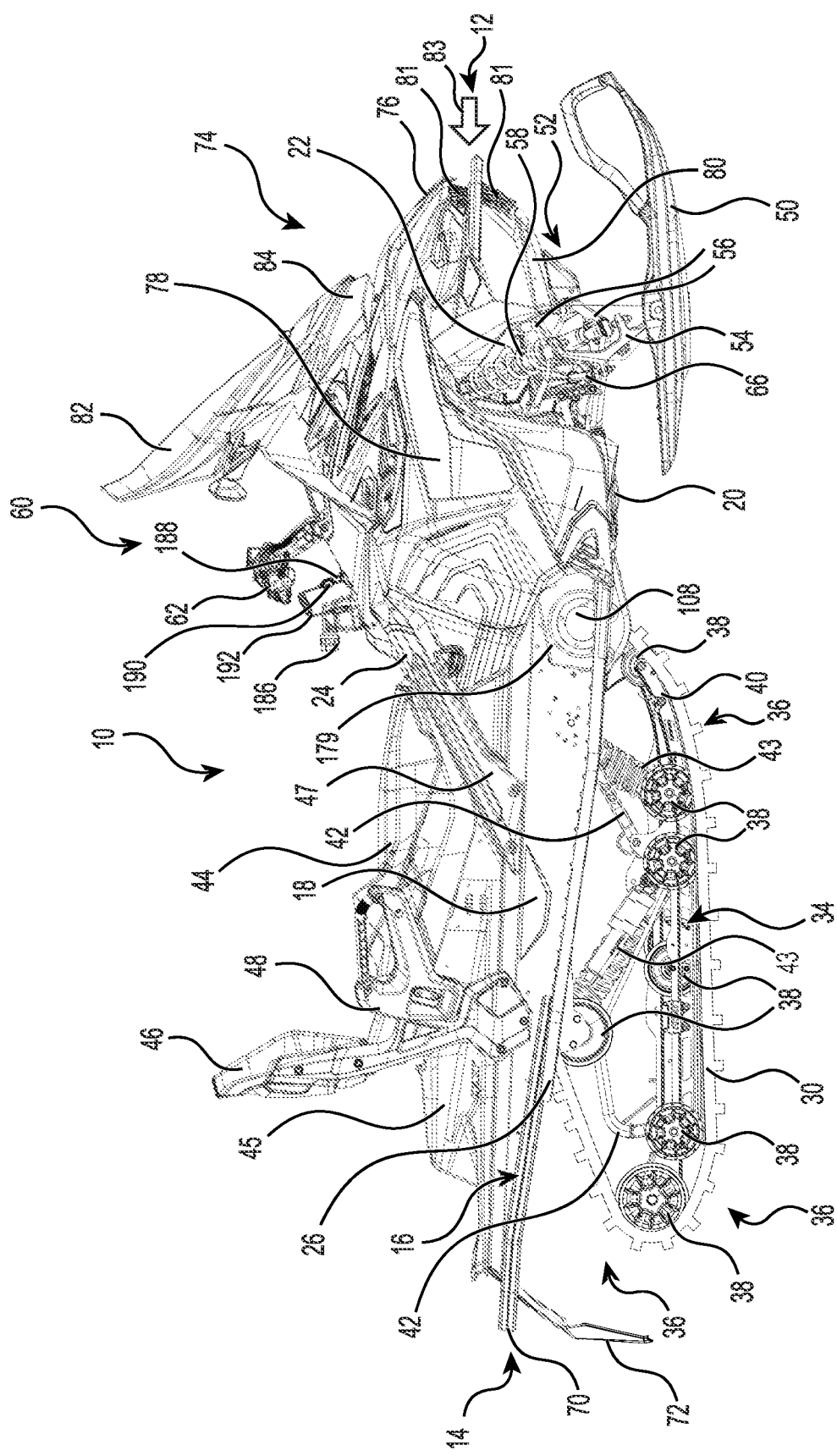
FIG. 1 is right side elevation view of an electric snowmobile.
Figure 2A:
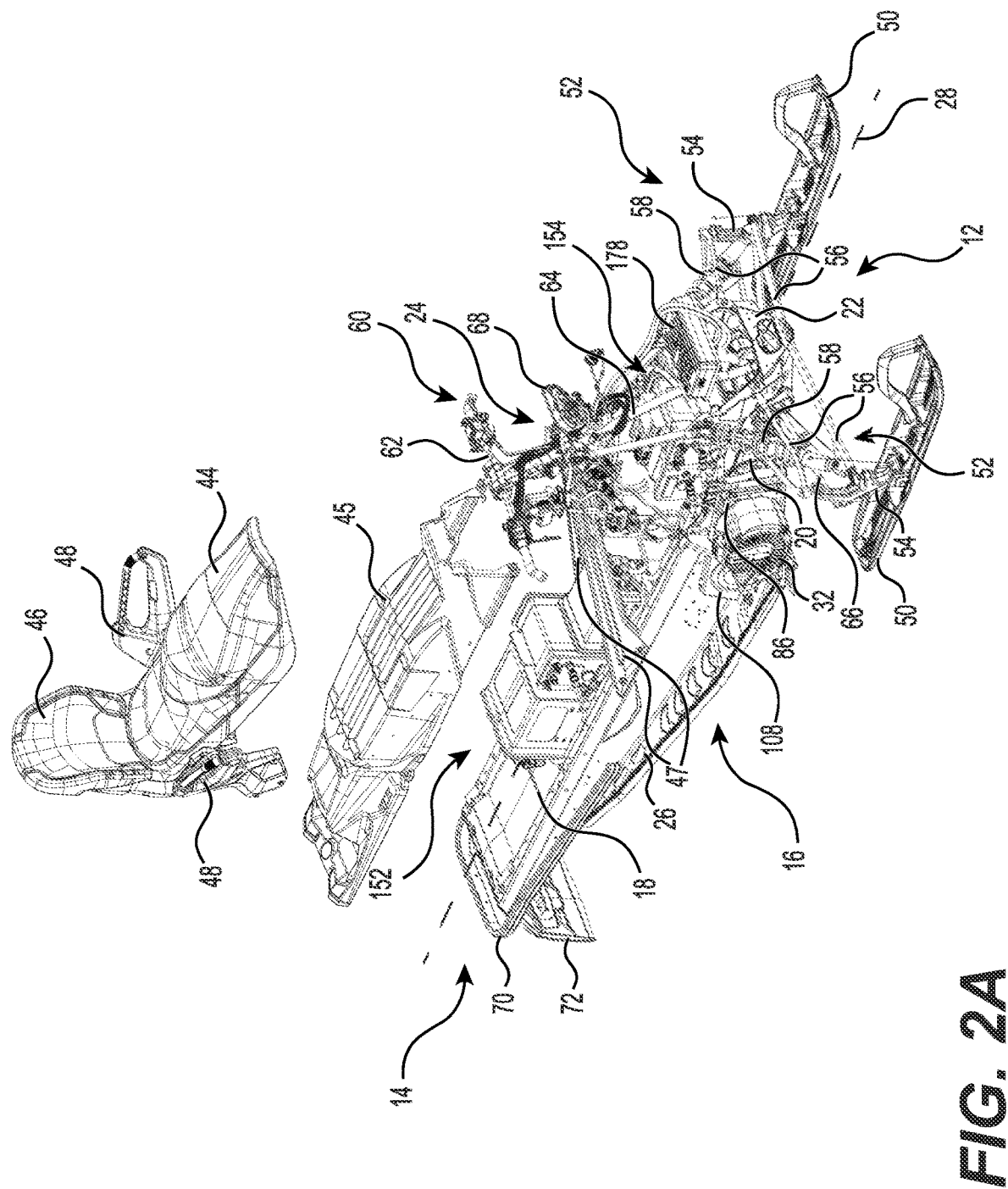
FIG. 2A is a perspective view taken from a front, right side of the snowmobile of FIG. 1, with a seat of the snowmobile and a battery cover shown separated from the frame, and with fairings, a rear suspension and a drive track being removed.
Figure 2B:
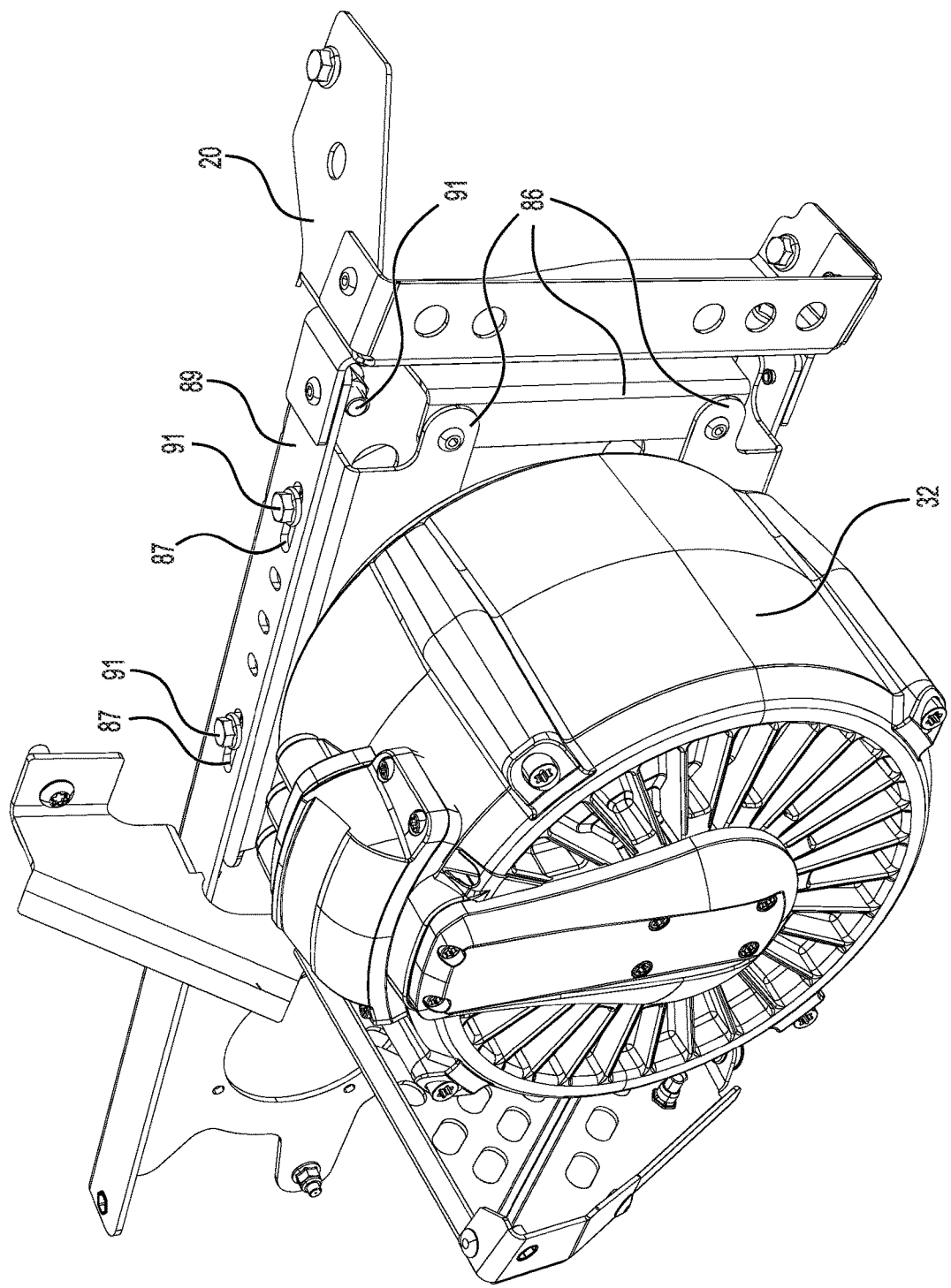
FIG. 2B is a close-up view of FIG. 2A showing the motor and neighbouring components of the snowmobile of FIG. 2A.
Figure 2C:
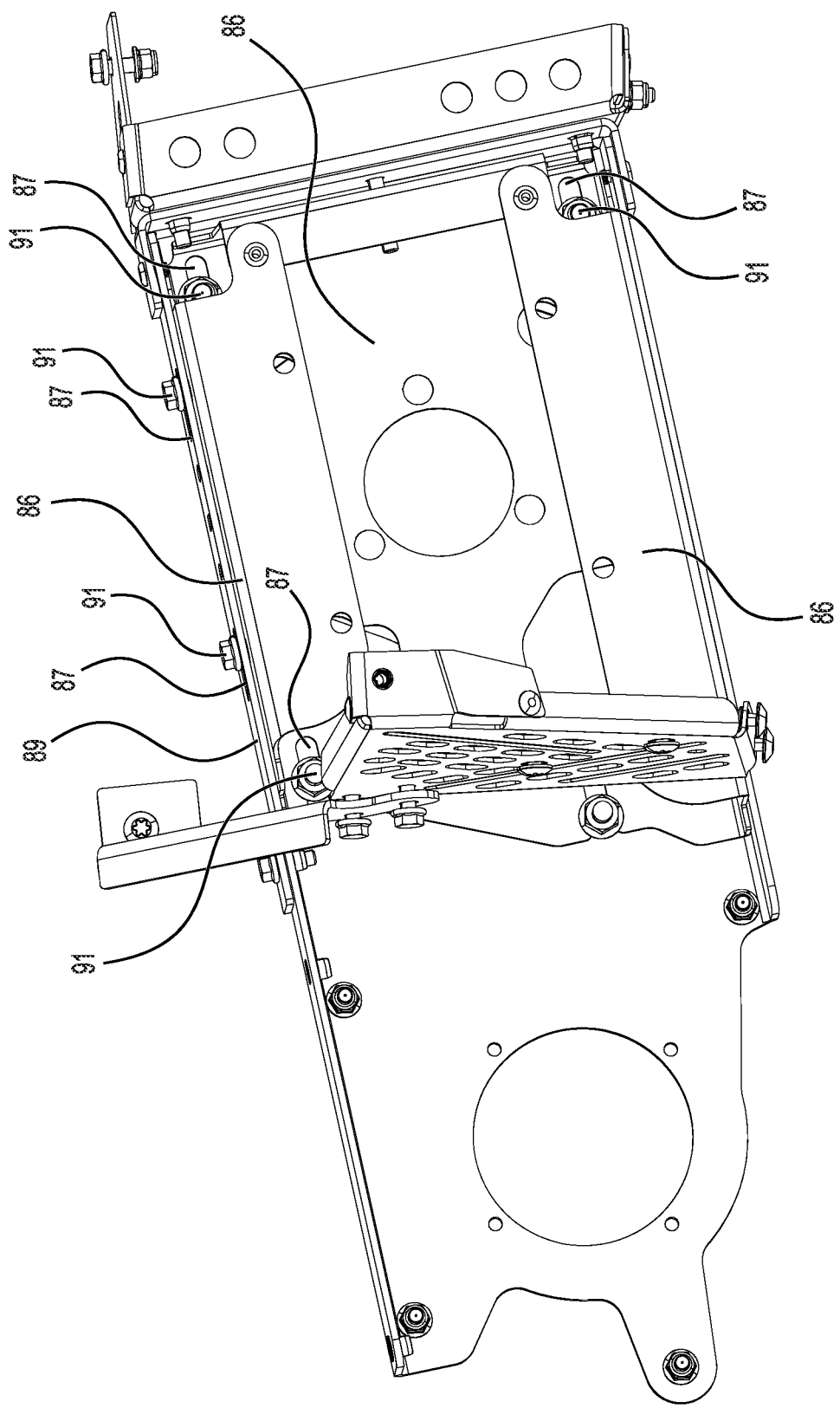
FIG. 2C is a perspective view taken from a rear, right side of the components of FIG. 2B with the motor removed.
Figure 3:
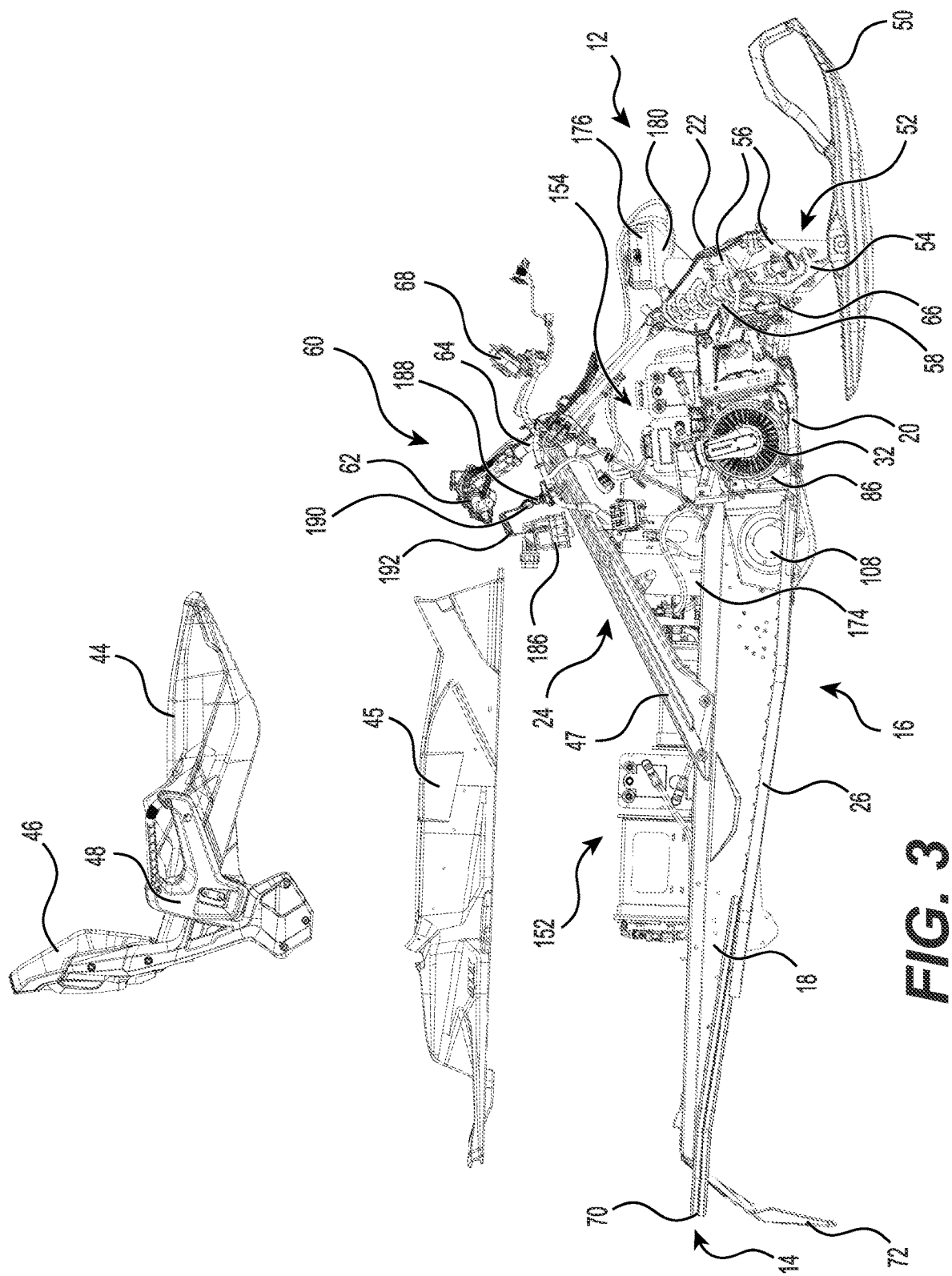
FIG. 3 is a right side elevation view of the components of FIG. 2A.

Referring to FIGS. 1 to 3, an electric snowmobile 10 includes a forward end 12 and a rearward end 14 which are defined consistently with a travel direction of the vehicle 10. The snowmobile 10 includes a frame 16 which includes a tunnel 18, a cradle 20, a front suspension module 22 and an upper support structure 24. The cradle 20 is connected to the front of the tunnel 18. The front suspension module 22 is connected to the front of the cradle 20. The upper support structure 24 is disposed above and is connected to the tunnel 18, the cradle 20 and the front suspension module 22. Left and right footrests 26 extend from the left and right sides of the tunnel 18 respectively. A longitudinal centerline 28 of the snowmobile (FIG. 6) is laterally centered relative to the tunnel 18. A frame of a snowmobile similar to the frame 16 is described in more detail in U.S. Pat. No. 10,392,079, issued Aug. 27, 2019, the entirety of which is incorporated herein by reference.

An endless drive track 30 is disposed under the tunnel 18. It is contemplated that in some embodiments, the endless drive track 30 could be longer than illustrated in FIG. 1, such that only a portion of the endless drive track 30 is disposed under the tunnel 18 and extends rearward of the tunnel 18. The endless drive track 30 is driven by an electric motor 32 to run about a rear suspension assembly 34 connected to the tunnel 18 for propulsion of the snowmobile 10 as will be described in more detail below. The endless drive track 30 has a plurality of external lugs 36 extending from an outer surface thereof to provide traction to the track 30.

The rear suspension assembly 34 includes idler wheels 38 and a pair of slide rails 40 in sliding contact with the endless drive track 30. The slide rails 40 are attached to the tunnel 18 by front and rear suspension arms 42 and by shock absorbers 43. It is contemplated that the snowmobile 10 could be provided with an embodiment of a rear suspension assembly 34 other than the one shown herein.

A battery cover 45 is disposed over the tunnel 18 and is connected to the tunnel 18. A front of the battery cover 45 extends between legs 47 of the upper support structure 24 of the frame 16. A straddle seat 44 is disposed over the cover 45, and is therefore also over the tunnel 18. The seat 44 is connected to the cover 45. As can be seen, the seat 44 covers a front portion and a middle portion of the battery cover 45, but not a rear portion of the battery cover 45. It is contemplated that depending on the size of the seat 44, more or less of the battery cover 45 could be covered by the seat 44. In some embodiments, the seat 44 is also connected to the frame 16, more specifically the upper support structure 24. A backrest 46 and armrests 48 are provide at a rear portion of the seat 44. The seat 44 is adapted to accommodate a driver and a passenger. It is contemplated that the backrest and the armrests 48 could be omitted. It is also contemplated that the seat 44 could be adapted to accommodate only a driver. The footrests 26 are located below the seat 44 to accommodate the driver's and the passenger's feet.

Two skis 50 positioned at the forward end 12 of the snowmobile 10 are attached to the front suspension module 22 of the frame 16 through front suspension assemblies 52. Each front suspension assembly 52 includes a ski leg 54, supporting arms 56, and a shock absorber 58. For each front suspension assembly 52: the ski leg 54 is connected to its respective ski 50; the supporting arms 56 are pivotally connected between the ski leg 54 and the front suspension module 22; and the shock absorber 58 is pivotally connected between a lower one of the supporting arms 56 and the front suspension module 22. It is contemplated that the snowmobile 10 could be provided with an embodiment of a front suspension assembly 52 other than the one shown herein.

A steering assembly 60 is provided generally forward of the seat 44. The steering assembly 60 includes a handlebar 62, a steering column 64 having an upper end connected to the handlebar 62 and steering rods 66 pivotally connected between a lower end of the steering column 64 and the ski legs 54. The steering column 64 is rotatably supported by the upper support structure 24. The handlebar 62 is used to rotate the steering column 64, and thereby the skis 50, in order to steer the snowmobile 10. A display cluster 68 is provided forward of the handlebar 62. The display cluster 68 provides information such as vehicle speed and battery charge level to the driver.

At the rear end of the snowmobile 10, a rear bumper 70 and a snow flap 72 are connected to the rear end of the tunnel 18. The snow flap 72 extends downward from the rear end of the tunnel 18. The snow flap 72 extends between the tunnel 18 and the rear bumper 70. During operation of the snowmobile 10, some of the snow projected rearward by the drive track 30 is redirected upwardly and forwardly so as to be projected onto a bottom of the tunnel 18.

At the front end 12 of the snowmobile 10, fairings 74 enclose the motor 32 and a portion of an electrical system 150 of the snowmobile 10, thereby providing an external shell that not only protects these components, but also makes the snowmobile 10 more aesthetically pleasing. The electrical system 150 will be described in more detail below. The fairings 74 include a hood 76, side panels 78 which can be opened to allow access to the motor 32 and/or a portion of the electrical system 150, and a belly pan 80. The fairings 74 also define forwardly facing air inlets 81 to allow air to enter the volume defined by the fairings 74 as the snowmobile moves forward as indicated by arrow 83 in FIG. 1. A windshield 82 is connected to the fairings 74 and acts as a wind screen to lessen the force of the air on the rider while the snowmobile 10 is moving. The windshield 82 could alternatively be connected directly to the handlebar 62. It is contemplated that the windshield 82 could be omitted. Two headlights 84 (only one of which is shown) are disposed in the fairings 74 below the windshield 82.

Figure 4:
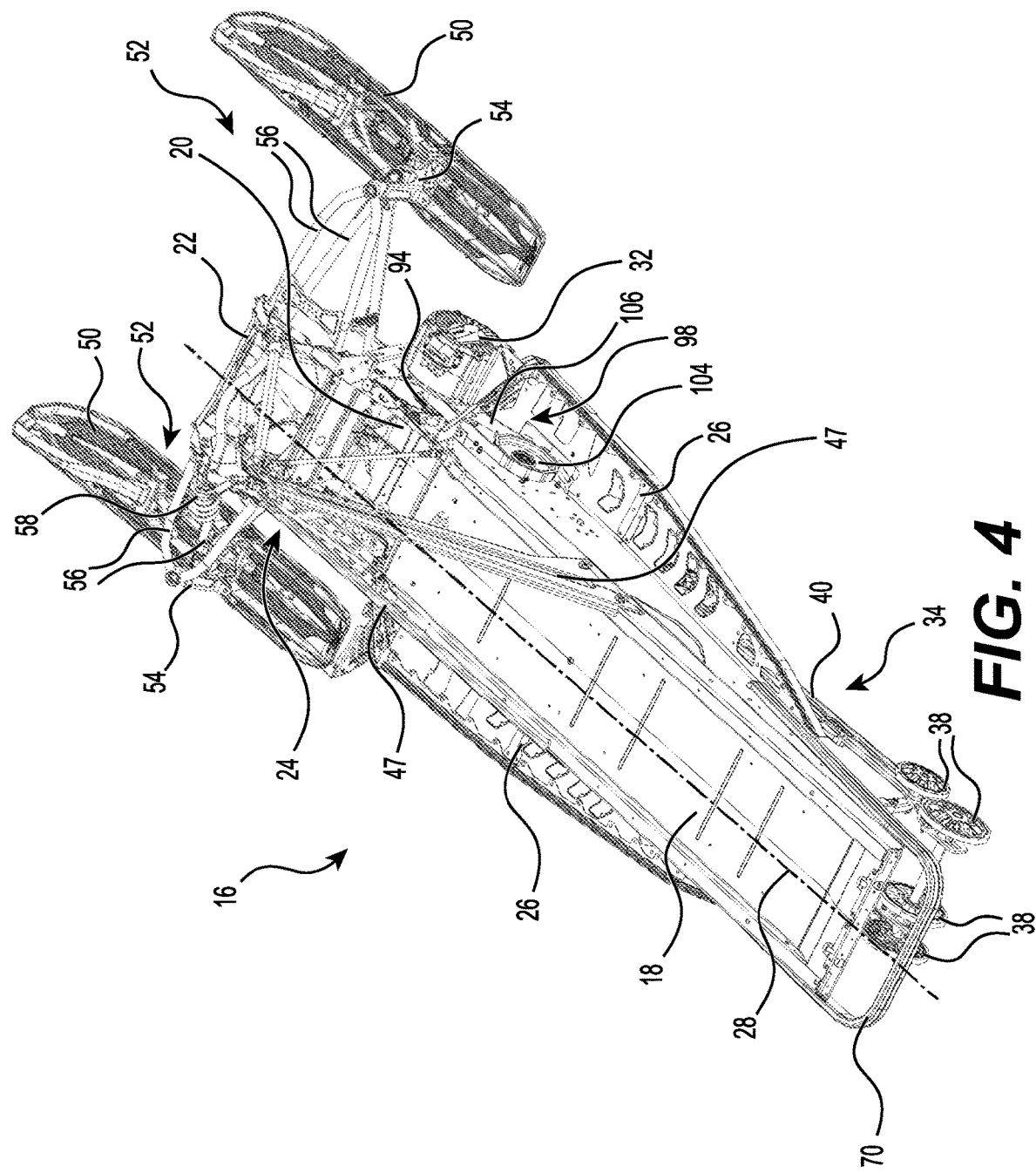
FIG. 4 is a perspective view taken from a rear, left side of a frame, a rear suspension, portions of front suspensions, skis, an electric motor and a mechanical drive of the snowmobile of FIG. 1.
Figure 5:
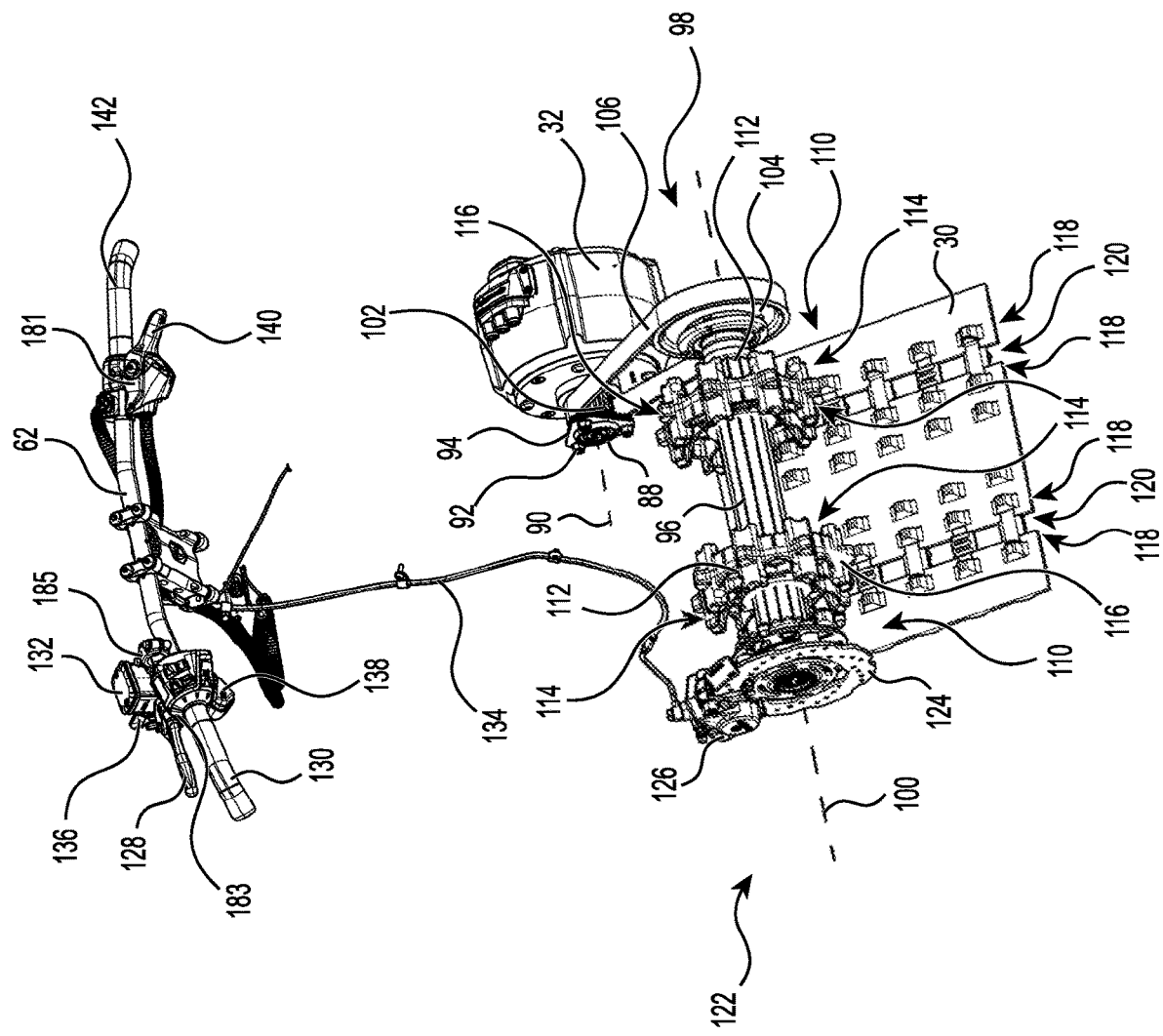
FIG. 5 is a perspective view taken from a rear, left side of a handlebar and associated components, a brake assembly, a drive axle, track drive sprockets, a portion of the drive track, the electric motor and the mechanical drive of the snowmobile of FIG. 1.

Turning now to FIGS. 2B, 2C, 4 and 5, a connection between the electric motor 32 and the frame 16 and an operative connection between the electric motor 32 and the drive track 30 will be described in more detail. As best seen in FIG. 4, the electric motor 32 is disposed on a right side of the longitudinal centerline 28 outside of the frame 16. As a result of this position, the electric motor 32 is disposed laterally outward (i.e. to the right) of the drive track 30 as can be seen in FIG. 5. Returning to FIG. 4, the electric motor 32 is disposed in front of and is laterally aligned with the right footrest 26. As best seen in FIG. 2B, brackets 86 connect the electric motor 32 to the right side of the cradle 20. The brackets 86 and a cradle member 89 of the cradle 20 to which the brackets 86 are connected define slots 87. The slots 87 receive fasteners 91 to fasten the brackets 86, and therefore the motor 32, to the cradle 20. The slots 87 allow the longitudinal position of the motor 32 to be adjusted for reasons explained below. With reference to FIG. 5, an output shaft 88 is connected to and extends laterally inward (i.e. toward the left) from the electric motor 32. When the electric motor 32 is operating, the electric motor 32 turns the output shaft 88 about an output shaft axis 90. The left end of the output shaft 88 is received in a bearing 92. The bearing 92 is received in a bearing housing 94. The bearing housing 94 is fastened to a right side of one of the brackets 86.

The output shaft 88 is operatively connected to a drive axle 96 by a mechanical drive 98 which, as can be seen in FIG. 5, is disposed laterally between the drive track 30 and the electric motor 32. The drive axle 96 is rotatable about a drive axle axis 100. In the present embodiment, the mechanical drive 98 is a flexible drive having a flexible element. More specifically, in the present embodiment, the flexible drive includes a drive sprocket 102 disposed on the output shaft 88, a driven sprocket 104 connected on the right end of the drive axle 96 outside the tunnel 18, and the flexible element which is a drive belt 106. The drive belt 106 is looped around the drive and the driven sprockets 102, 104.

The drive belt 106 is disposed laterally between the drive track 30 and the electric motor 32. As can be seen, the driven sprocket 106 has a larger diameter than the drive sprocket 104, such that the drive axle 96 rotates slower than the output shaft 88. As indicated above, the slots 87 allow the longitudinal position of the motor 32 to be adjusted. By adjusting the longitudinal position of the motor 32, the distance between drive and the driven sprockets 102, 104 can be adjusted. By adjusting the distance between the drive and the driven sprockets 102, 104, the tension in the drive belt 106 can also be adjusted. As such, in the present embodiment, a separate belt tensioning mechanism is not needed. It is contemplated that the flexible element could be a hinged belt, such as a chain. It is also contemplated that the drive sprocket 102 and the driven sprocket 104 could be replaced by a drive pulley and a driven pulley. It is also contemplated that the mechanical drive 98 could be a rigid drive, such as a gear drive for example. The drive sprocket 102, the driven sprocket 104 and the drive belt 106 are disposed inside a housing 108 (FIG. 1). As can be seen, the output shaft 88 and the drive axle 96 extend laterally and are parallel to each other. The output shaft 88 is disposed forward and upward of the drive axle 96.

The drive axle 96 extends laterally through a forward portion of the tunnel 18 such that the ends of the drive axle 96 extend out of the sides of the tunnel 18. As can be seen in FIG. 5, two track drive sprockets 110 are disposed on the drive axle 96 and engage the drive track 30. The track drive sprockets 110 are disposed inside the tunnel 18 between the sides of the tunnel 18. It is contemplated that in some embodiments only a single or more than two track drive sprockets 110 could be provided. Each track drive sprocket 110 has a sprocket wheel 112 from which extends two sets of axial sprocket teeth 114 and one set of radial sprocket teeth 116. The axial sprocket teeth 114 are circumferentially-spaced teeth that project axially outwardly from the sprocket wheel 112. The radial sprocket teeth 116 are circumferentially-spaced teeth that project radially outwardly from the sprocket wheel 112. It is contemplated that each track drive sprocket 110 could have only one or two of the sets of teeth 114, 116. As the drive axle 96 rotates, the axial sprocket teeth 114 engage internal lugs 118 of the drive track 30 and the radial sprocket teeth 116 are received in apertures 120 defined in the drive track 30, thereby driving the drive track 30.

With reference to FIG. 5, a brake 122 is provided on the left side of the drive axle 96. The brake 122 includes a brake disc 124, a brake caliper 126 and brake pads (not shown) provided on the brake caliper 126. The brake disc 124 is coaxially mounted the left end of the drive axle 96 outside the tunnel 18. The brake disc 124 rotates with the drive axle 96 about the drive axle axis 100. The brake disc 124 is engaged by the brake caliper 126 in response to actuation of a brake lever 128 mounted on a left handle 130 of the handlebar 62. The brake lever 128 is connected to a master cylinder 132, which is also mounted on the left handle 130. The master cylinder 132 is hydraulically connected to the brake caliper 126 by a brake line 134. Upon actuation of the brake lever 128, hydraulic pressure causes the brake caliper 126 to apply a braking force on the brake disk 124, in order to slow down or stop motion of the snowmobile 10.

A housing 136 is mounted on the left handle 130 near the brake lever 128. A number of switches and buttons, including a start/reverse button 138 are provided on the housing 136. The start/reverse button 138 functions as both a start button and a reverse button and will be referred to as the start button 138 and the reverse button 138 interchangeably herein depending on the function of the button 138 being used. It is also contemplated that in some embodiments the snowmobile 10 could have separate start and reverse buttons. The housing 136 and the brake lever 128 are close enough to each other to allow a driver of the snowmobile 10 to actuate a button or a switch on the housing 136 using a thumb of his/her left hand, while at the same time actuating the brake lever 128 with the remaining fingers of his/her left hand. An acceleration lever 140, which is referred to as a throttle lever in vehicles powered by an internal combustion engine, is mounted on a right handle 142 of the handlebar 62. In the present embodiment, the acceleration lever 140 is a thumb actuated lever but other types of acceleration levers are contemplated.

It is contemplated that the electric motor 32 and the mechanical drive 98 could be provided on a left side of the centerline 28 so as to drive the left end of the drive axle 96 and that the brake 122 could be disposed on the right end of the drive axle 96.

Figure 6:
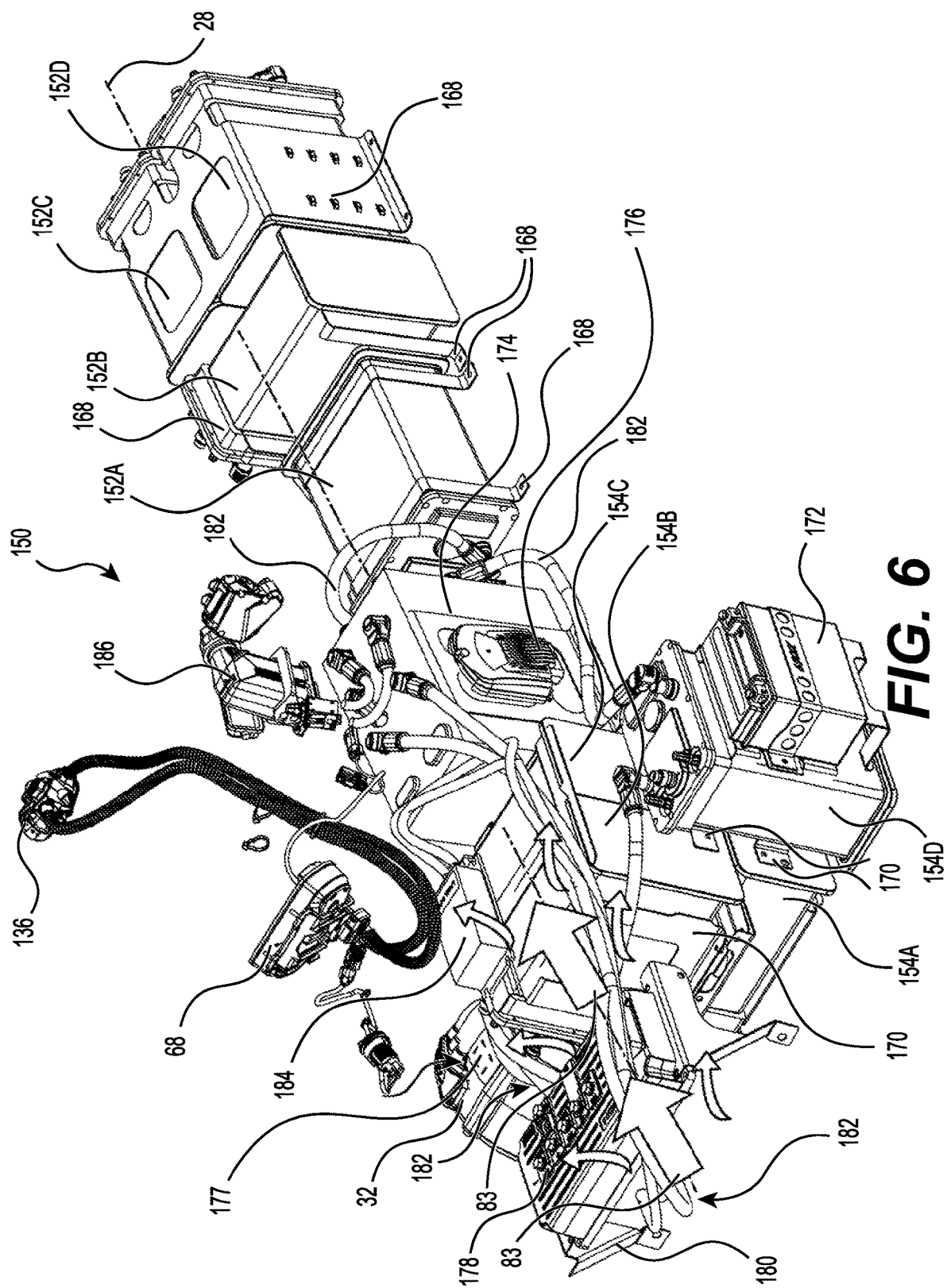
FIG. 6 is a perspective view taken from a front, left side of an electrical system of the snowmobile of FIG. 1.
Figure 7:
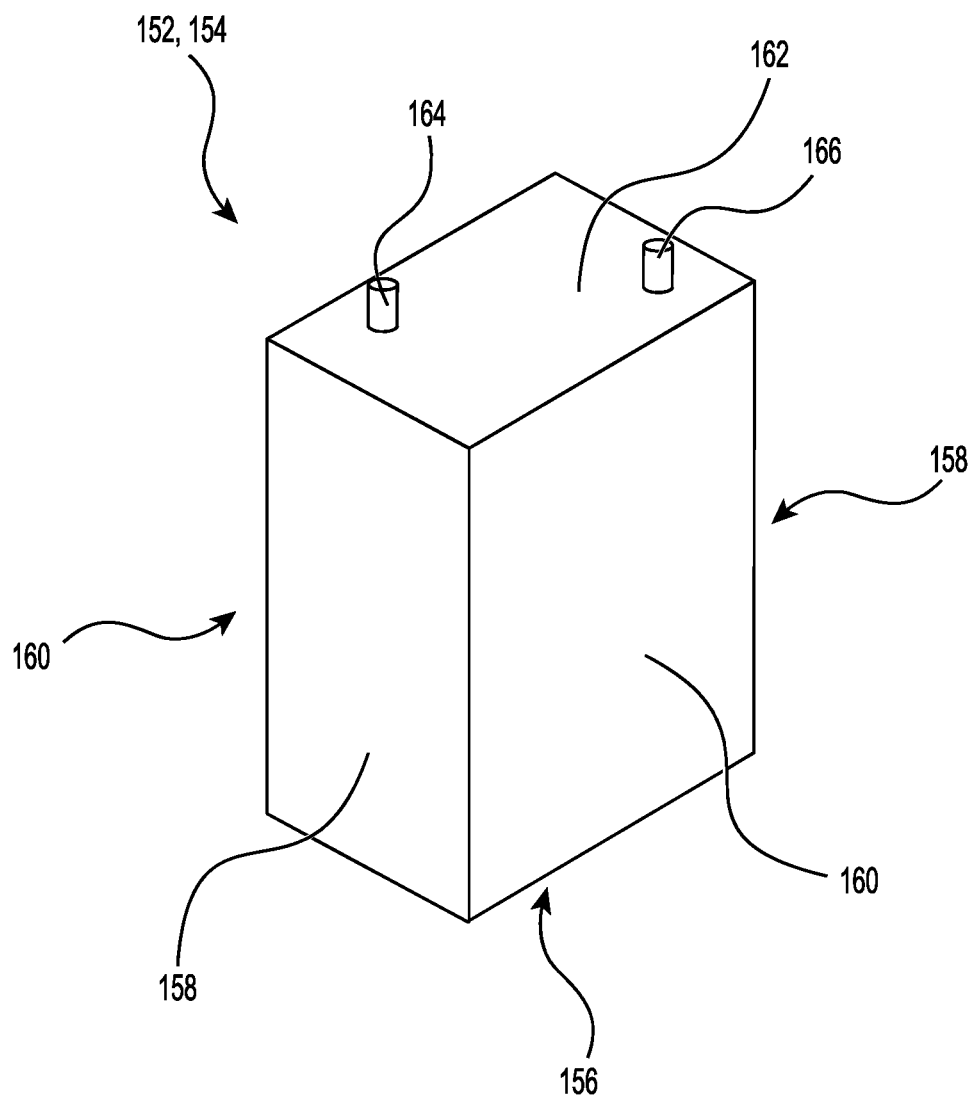
FIG. 7 is a perspective view of a schematic representation of a battery of the electrical system of FIG. 6.

Turning now to FIG. 6, the electrical system 150 of the snowmobile 10 will be described. The electrical system includes the electric motor 32, eight batteries 152, 154 electrically connected to the electric motor 32 to power the electric motor 32, and a number of other electrical components, some of which are described further below. In the present embodiment, the electric motor 32 is an alternating current (AC) motor. The batteries 152, 154 includes a group of four batteries 152 disposed rearward of the drive axle 96, on the tunnel 18 and under the seat 44 (see FIG. 2A), and a group of four batteries 154 disposed forward of the drive axle 96 in the cradle 20 (see FIG. 3). During operation of the snowmobile 10, the snow projected onto a bottom of the tunnel 18 by the drive track 30 cools the tunnel 18 which in turn cools the batteries 152 disposed on the tunnel 18. It is contemplated that each group of batteries 152, 154 could have more or less than four batteries 152 or 154. It is contemplated that in some embodiments, the batteries 154 could be omitted. In the present embodiment, all of the batteries 152, 154 are the same. More specifically, in the present embodiment each battery 152, 154 is a 24-volt lithium-ion battery, but other types of batteries, such as lead-acid batteries for example, are contemplated. With reference to FIG. 7, each battery 152, 154 has a base 156, two opposed short sides 158, two opposed long sides 160, and a pole side 162 opposite the base 156. A positive pole 164 and a negative pole 166 extend from the pole side 162. In some embodiments, it is contemplated that one or more batteries 152, 154 could differ from the others.

The group of batteries 152 includes batteries 152A, 152B, 152C and 152D. The battery 152A is disposed on the tunnel 18 with a long side 160 facing the tunnel 18 and the pole side 162 facing the front of the snowmobile 10. It is contemplated that the pole side 162 of the battery 152A could face the rear of the snowmobile 10. The battery 152B is disposed on the tunnel 18 behind the battery 152A, with a short side 158 facing the tunnel 118 and the pole side 162 facing the right side of the snowmobile 10. It is contemplated that the pole side 162 of the battery 152B could face the left side of the snowmobile 10. The batteries 152A, 152B are generally laterally centered relative to the centerline 28. The batteries 152C, 152D are disposed next to each other on either side of the centerline 28 behind the battery 152B. Each battery 152C, 152D is disposed on the tunnel 18 with a short side 158 facing the tunnel 118 and the pole side 162 facing the rear of the snowmobile 10. It is contemplated that the pole sides 162 of the batteries 152C, 152D could face the front of the snowmobile 10. As such, the group of batteries 152 is generally laterally centered relative to the centerline 28. Brackets 168 are disposed over the batteries 152 and are fastened to the tunnel 18 to keep the batteries 152 in position. It is contemplated that the batteries 152 could be disposed differently. The battery cover 45 is disposed over the batteries 152 so as to define a battery housing between the top of the tunnel 18 and the cover 45. An interface between a lower edge of the battery cover 45 and the top of the tunnel 18 is sealed to prevent snow and water from entering the battery housing. In one embodiment, an elastomeric seal is disposed between the lower edge of the battery cover 45 and the top of the tunnel 18. The sides of the seat 44 extend along the sides of the battery cover 45 below the top of the batteries 152.

Figure 8:
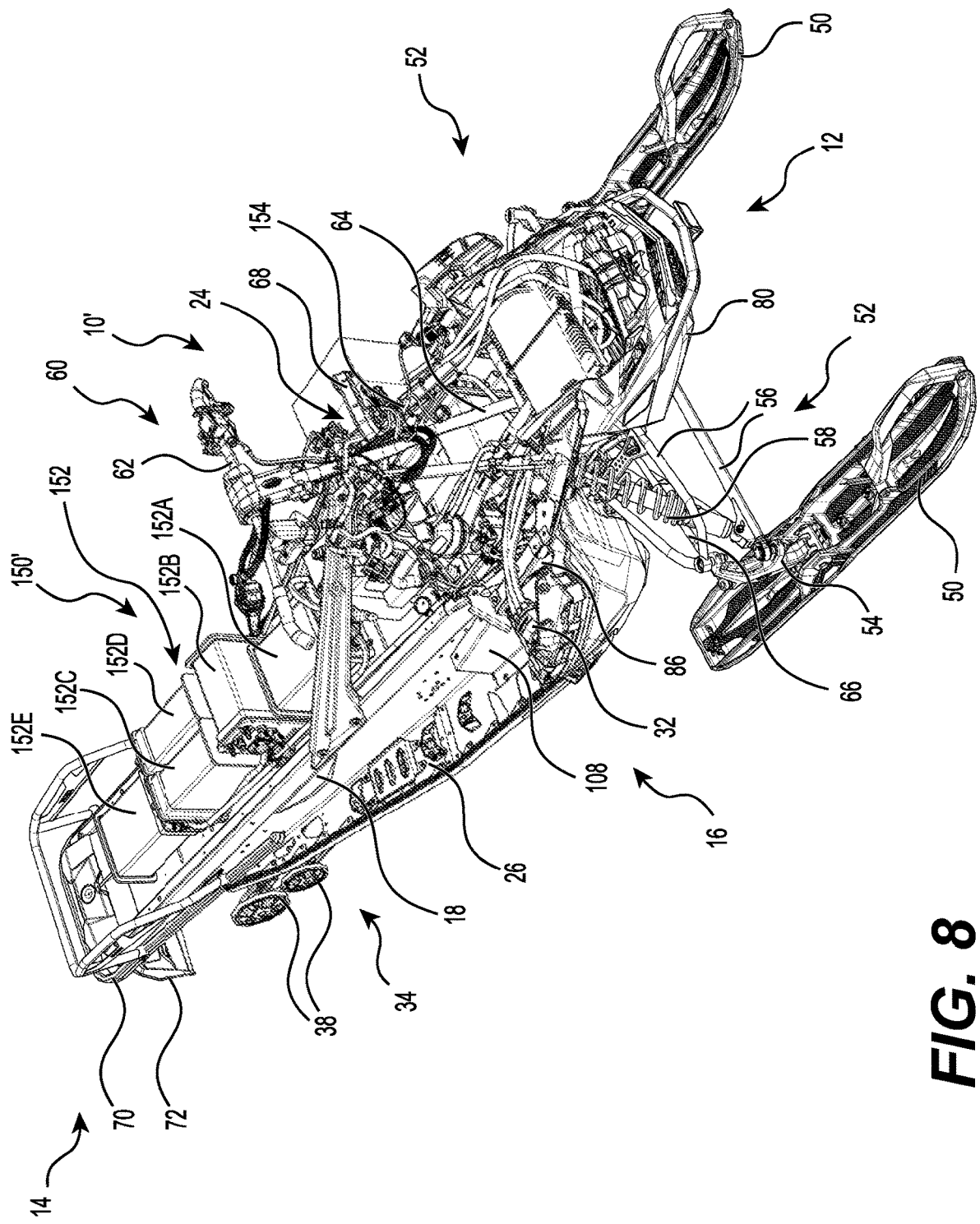
FIG. 8 is a perspective view taken from a front, right side of an alternative embodiment of the snowmobile of FIG. 1 with fairings, the seat and the drive track removed.

With reference to FIG. 8, in a snowmobile 10', which is an alternative embodiment of the snowmobile 10, an electrical system 150' has a fifth battery 152E. The battery 152E is disposed on the tunnel 18 behind the batteries 152C and 152D, with a long side 160 facing the tunnel 18 and the pole side 162 facing the front of the snowmobile 10. It is contemplated that the pole side 162 of the battery 152E could face the rear of the snowmobile 10.

Returning to FIG. 6, the group of batteries 154 includes batteries 154A, 154B, 154C and 154D. The battery 154A is disposed in the cradle 20 with a long side 160 facing the cradle 20 and the pole side 162 facing the right side of the snowmobile 10. The battery 154B is disposed on the battery 154A with a short side 158 facing the battery 154A and the pole side 162 facing the right side of the snowmobile 10. The battery 154C is disposed on the battery 154A behind the battery 154B, with a short side 158 facing the battery 154A and the pole side 162 facing the right side of the snowmobile 10. It is contemplated that the pole sides 162 of the batteries 154A, 154B, 154C could face the left side of the snowmobile 10. The batteries 154A, 154B, 154C are generally laterally centered relative to the centerline 28. The battery 154D is disposed completely on the left side of the centerline 28 to the left of the batteries 154A, 154B, 154C. The battery 154D is disposed in the cradle 20 with the base 156 facing the cradle 20 and the pole side 162 facing up. As such, the group of batteries 154 is laterally offset toward the left side of the centerline 28, thereby at least partially counterbalancing the weight of the electric motor 32. Brackets 170 are disposed over the batteries 152 and are fastened to the cradle 20 or to other brackets to keep the batteries 154 in position. It is contemplated that the batteries 154 could be disposed differently. For example, it is contemplated that the battery 154D could be disposed completely on the right side of the centerline 28 in embodiments where the electric motor 32 is provided on the left side of the centerline 28.

A 12-volt lead-acid battery 172 is mounted to the left side of the battery 154D. The battery 172 is electrically connected to low-voltage components of the electrical system 150, such as the display cluster 68. It is contemplated that the battery 172 could be a different type of battery and/or that the battery 172 could be mounted elsewhere in the snowmobile 10. It is contemplated that in some embodiments the battery 172 could be omitted and that voltage from the batteries 152, 154 could be supplied to the low-voltage components via a voltage converter.

A battery control unit (BCU) 174 is disposed longitudinally between the group of batteries 152 and the group of batteries 154 and is generally laterally centered relative to the centerline 28. The BCU 174 is disposed on the top, front portion of the tunnel 18, forward of the seat 44 (see FIG. 3). The batteries 152 are electrically connected in series and are electrically connected to the BCU 174. The batteries 154 are electrically connected in series and are electrically connected to the BCU 174 separately from the batteries 152. In an alternative embodiment, all of the batteries 152, 154 are connected in series and electrically connect together to the BCU 174. The BCU 174 receives electrical power from the batteries 152, 154 and supplies a controlled amount of electrical power to the electric motor 32 during operation of the electric motor 32. The BCU 174 also controls the electrical power distribution to the batteries 152, 154 when recharging the batteries 152, 154.

A vehicle control unit (VCU) 176 is mounted to the left side of the BCU 174. It is contemplated that the VCU 176 could be disposed elsewhere in the snowmobile 10. The VCU 176 receives signals from various sensors provided on the snowmobile 10, and the switches and buttons on the housing 136, and sends signals to the BCU 174 indicative of the amount of electrical power to be supplied to the electric motor 32 based on the signals received from these sensors, switches and buttons. The sensors include, but are not limited to, a motor speed sensor 177 sensing a speed of the electric motor 32, a vehicle speed sensor 179 (FIG. 1) sensing a speed of the snowmobile 10, and an acceleration lever position sensor 181 (FIG. 5) sensing a position of the acceleration lever 140. The VCU 176 is also connected to the display cluster 68 to send signals to the display cluster 68 for providing information to be displayed on the display cluster 68.

An inverter 178 is disposed in front of the batteries 154. The inverter 178 is mounted to the front suspension module 22 by a bracket 180 (see FIG. 3). The inverter 178 electrically connects the BCU 174 to the electric motor 32. The inverter 178 converts the direct current (DC) received from the BCU 174 to alternating current (AC) to be supplied to the electric motor 32. High voltage cables 182 provide the electrical connections between the batteries 152, 154, the BCU 174, the inverter 178 and the electric motor 32. As can be seen in FIG. 2A, the battery cover 45 is opened at a front thereof to permit the passage of the high voltage cables 182 connected to the batteries 152. A DC-DC converter 184 is disposed on top of the batteries 154B, 154C. It is contemplated that the DC-DC converter 184 could be disposed elsewhere in the snowmobile 10. The DC-DC converter 184 receives high voltage from the BCU 174, reduces the voltage to 12 volts and supplies the reduced voltage electrical power to low voltage components of the snowmobile 10, such as the display cluster 68, and to the battery 172 to recharge it. The inverter 178 and the DC-DC converter 184 are located such that air entering the air inlets 81 as the snowmobile 10 moves forward flows over the inverter 178 and the DC-DC converter 184 to cool them as indicated by arrows 83 in FIGS. 1 and 6.

In order to recharge the batteries 152, 154 when the snowmobile 10 is not in use, a charging socket 186 is provided. The charging socket 186 is electrically connected to the BCU 174 and permits the connection of a suitable power cable (not shown) that is connected to a power source, such as a standard power outlet or a charging station, in order to recharge the batteries 152, 154. As can be seen in FIG. 1, the charging socket 186 is disposed partly outside of the fairings 74, forward of the seat 44 and rearward of the handlebar 62. As can be seen in FIGS. 3 and 6, the charging socket 186 is disposed above the BCU 174.

The snowmobile 10 is provided with a security system such as, for example, Bombardier Recreation Product's Digitally Encoded Security System (DESS™). With reference to FIG. 1, the security system includes a key receiver 188 and a key 190 tied to a lanyard 192. The key 190 fits over the key receiver 188. The key 190 includes a magnet and a digitally encoded chip containing identification information. The key receiver 188 comprises a reed switch which can be actuated by a magnetic field. When the key 190 is installed on the key receiver 188, the magnet in the key 190 closes the reed switch. When the key 190 is removed from the key receiver 188, the reed switch becomes open. The reed switch is part of a security system circuit which is completed when the reed switch is closed. The security system circuit further includes a security system transponder and the battery 172. When the reed switch is closed, the battery 172 is connected to the security system transponder. The transponder is thus activated for receiving and sending signals. The security system transponder communicates with the linked digitally encoded key 190 and the VCU 176. The transponder requests and receives the encoded identification information from the key 190. The transponder transmits the encoded identification information to the VCU 176. The VCU 176 decodes the identification information and compares the identification information of the security system key 190 with a database of authorized identification codes to determine whether the security system key 190 is authorized for operating the snowmobile 10. If the system key 190 is authorized for operating the snowmobile 10, the snowmobile 10 can be started. It should be understood that the security system having a magnetic key 190 and complementary key receiver 188 with a reed switch as described above is only meant to be exemplary. Other embodiments of systems for verifying authorization are also contemplated. The lanyard 192 attached to the end of the key 190 is intended to be clipped to the driver of the snowmobile 10. If the snowmobile driver leaves the snowmobile 10, the key 190 fastened to the snowmobile driver by the lanyard 192, disengages from the key receiver 132. The operation of the electric motor 32 and other systems are interrupted when the security system key 190 is removed from the key receiver 188. The security system 130 thus also serves as a safety system for the snowmobile 10 terminating operation of the snowmobile 10 if the snowmobile driver is separated from the snowmobile 10 during operation. Thus, the electric motor 32 and other systems of the snowmobile 10 can be turned on or activated only if the key 190 is coupled to, or installed on, the key receiver 188. The electric motor 32 is operable only when an authorized security system key 190 is installed on the key receiver 188, a motor cut-off switch (not shown) is in an "OFF" position or deactivated, and the start button 138 is in an "ON" position. A security system similar to the one described above is described in more detail in U.S. Pat. No. 10,450,968, issued Oct. 22, 2019, the entirety of which is incorporated herein by reference. An alternative embodiment of such a system is described in U.S. Pat. No. 10,596,986, issued Mar. 24, 2020, the entirety of which is incorporated herein by reference.

In the snowmobile 10, when the key 190 is separated from the key receiver 188, the VCU 176 controls at least one of the headlights 84 to flash repeatedly on and off for a predetermined period of time, for example 10 seconds. It is also contemplated that one or more brake lights (not shown) could also flash repeatedly on and off for the predetermined period of time when the key 190 is separated from the key receiver 180. It is contemplated that the key receiver and the key 188 could be replaced by a cut-off switch having a portion on the snowmobile 10 and a portion connected to the lanyard 192, which causes interruption of the operation of the electric motor 32 when the portions become separated (i.e. similar to the key 190 and key receiver 188, but without the identification function). In such an embodiment, the VCU 176 would also cause one or more lights of the snowmobile 10 to flash repeatedly on and off for the predetermined period of time should the two portions of the cut-off switch become separated.

Figure 9:
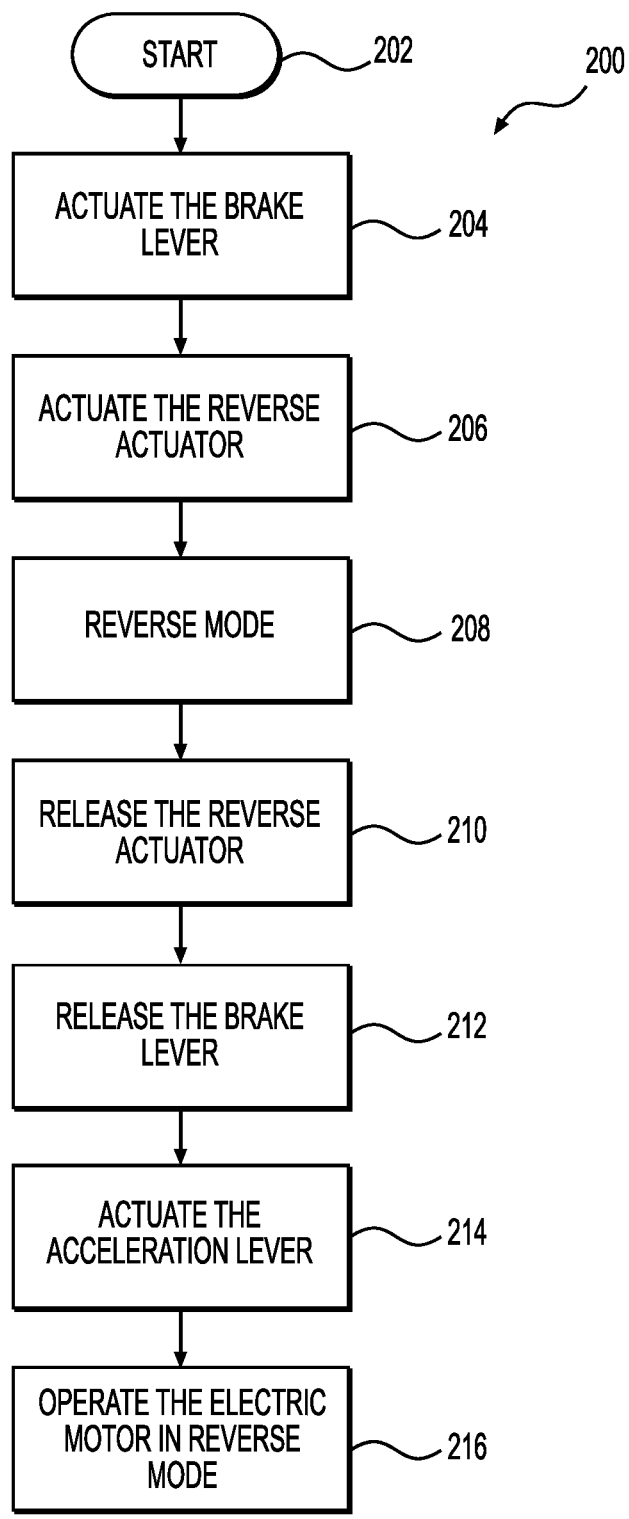
FIG. 9 is a logic diagram illustrating a method for making an electric vehicle, such as the snowmobile of FIG. 1, operate in reverse.

Turning now to FIG. 9, a method 200 for making the snowmobile 10 operate in reverse will be described. It is contemplated that the method 200 could be used in other types of electric vehicles such as, but not limited to, straddle-type electric all-terrain vehicles (ATVs) and electric motorcycles. Some of these other types of electric vehicles may be provided with a brake pedal and an acceleration pedal or an acceleration twist grip instead of the brake lever 128 and the acceleration lever 140. The method 200 will be described with reference to the brake lever 128 and the acceleration lever 140, but it should be understood that other kinds of brake input devices and acceleration input devices could be used.

The method 200 starts at 202 when the snowmobile 10 is turned on. In order to operate the snowmobile 10 in reverse, the driver of the snowmobile 10 has to actuate the brake lever 128 (step 204) and then a reverse actuator (step 206) while the brake lever 128 is actuated. In the present embodiment, the reverse actuator is the reverse button 138. As previously mentioned, the brake lever 128 and the reverse button 138 can be actuated at the same time by the driver using a single hand. It is contemplated that the reverse button 138 could be actuated before the brake lever 128 is actuated, as long as the reverse button 138 is actuated while the brake lever 128 is also actuated.

The VCU 176 can determine the position of the brake lever 128 based on a signal received from a brake lever position sensor 183 (FIG. 5) or from a pressure sensor 185 (FIG. 5) sensing hydraulic pressure in the master cylinder 136 or in the brake line 134. Based on the signals from the sensors 183 or 185 and from the reverse button 138, the VCU 176 can determine if the brake lever 128 and the reverse button 138 are actuated simultaneously. In response to the brake lever 128 and the reverse button 138 being actuated simultaneously, at step 208 the VCU 176 sends a signal to the BCU 174 indicating that the electric motor 32 should now be operated in a reverse mode (i.e. the electric motor 32 should be turned in a direction that will make the snowmobile 10 move in reverse). The VCU 176 also sends a signal to the display cluster 68 to display that the reverse mode is engaged. It is also contemplated that a noise could be generated to indicate that the reverse mode is engaged.

Once the reverse mode is engaged, the driver releases the reverse button 138 (step 210) and then brake lever 128 (step 212). It is contemplated that the brake lever 128 and the reverse button 138 could be released in any order. The reverse motor 32 can now be operated in the reverse mode. In the present embodiment, the brake lever 128 has to be completely released before the electric motor can be operated in the reverse mode, but it is contemplated that in some embodiments the brake lever 128 could only be partially released.

To operate the electric motor 32 in the reverse mode, the driver actuates the acceleration lever 140 (step 214). At step 216, the VCU 176 and the BCU 174 operate the electric motor 32 based at least in part on the position of the acceleration lever 140, as a result of which the snowmobile 10 moves in reverse.

To change from the reverse mode of operation to a forward mode of operation, the driver has to once again actuate the brake lever 128 and the reverse button 138 simultaneously, and then releases both the brake lever 128 and the reverse button 138.

Figure 10:
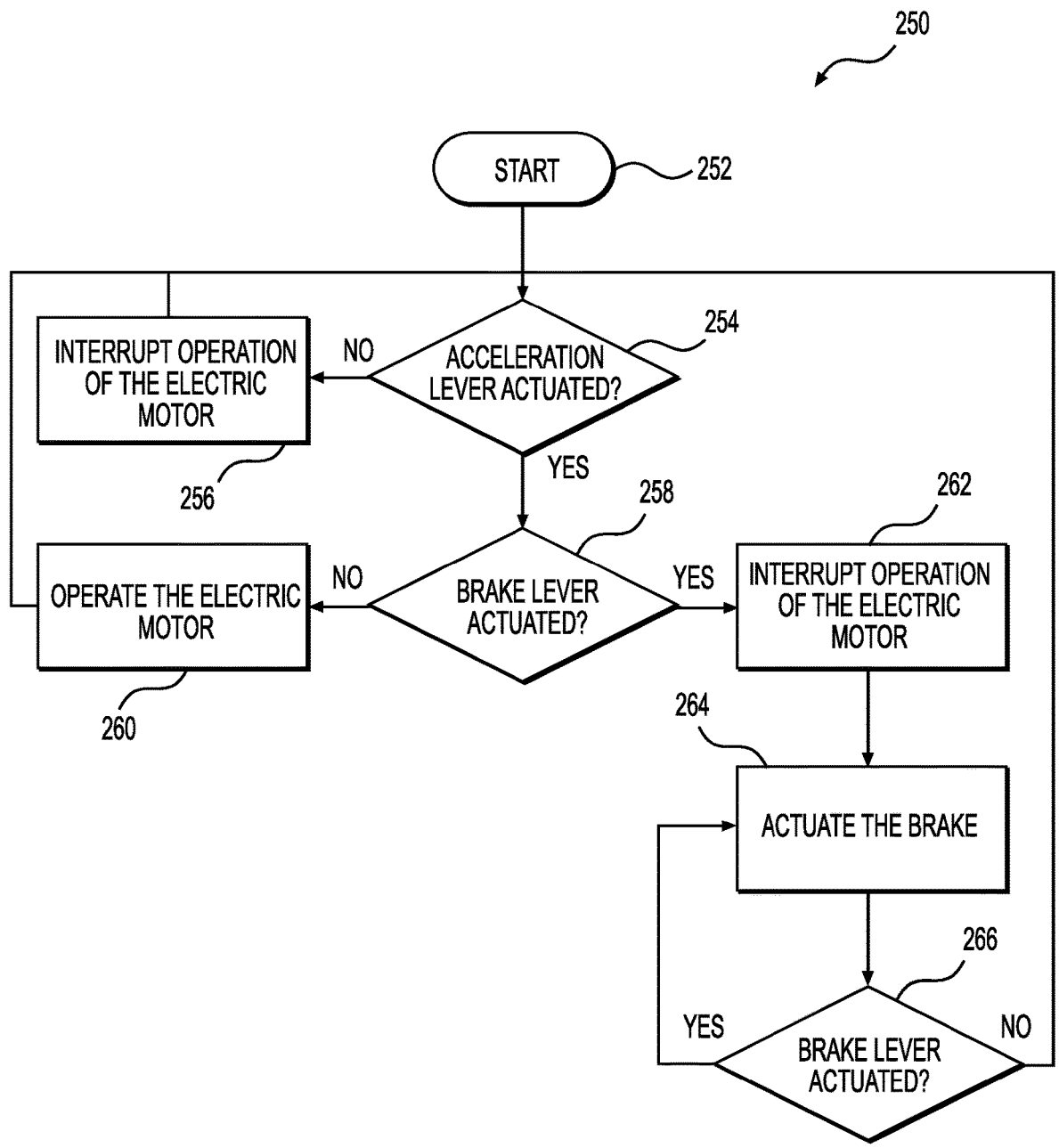
FIG. 10 is a logic diagram illustrating a method for braking an electric vehicle, such as the snowmobile of FIG. 1.

Turning now to FIG. 10, a method 250 for braking the snowmobile 10 will be described. It is contemplated that the method 250 could be used in other types of electric vehicles such as, but not limited to, straddle-type electric all-terrain vehicles (ATVs) and electric motorcycles. Some of these other types of electric vehicles may be provided with a brake pedal and an acceleration pedal or an acceleration twist grip instead of the brake lever 128 and the acceleration lever 140. The method 250 will be described with reference to the brake lever 128 and the acceleration lever 140, but it should be understood that other kinds of brake input devices and acceleration input devices could be used.

The method 250 starts at 252 when the snowmobile 10 is turned on. At step 254, the VCU 176 determines if the acceleration lever 140 is actuated based on a signal from the acceleration lever position sensor 181. If the acceleration lever 140 is not actuated, then at step 256 the VCU 176 sends a signal to the BCU 174 to interrupt the operation of the electric motor 32 (unless it was already interrupted) and then the VCU 176 returns to step 254. It should be noted that in the present embodiment, interrupting the operation of the electric motor 32 does not mean actively stopping rotation of the electric motor 32 by supplying electric power to the electric motor 32 to generate a braking torque on the electric motor 32, but rather stopping the supply of electric power to the electric motor 32. In some embodiment, if the electric motor 32 rotates when its operation is interrupted, it is contemplated that the rotation of the electric motor 32 can be used to generate electric power to recharge the batteries 152, 154. It is contemplated that in some embodiments, interrupting the operation of the electric motor 32 could include actively stopping rotation of the electric motor 32 by supplying electric power to the electric motor 32 to generate a braking torque on the electric motor 32.

If at step 254 the VCU 176 determines that the acceleration lever 140 is actuated, then at step 258 the VCU 176 determines if the brake lever 128 is actuated. The position of the brake lever 128 can be determined by the brake lever position sensor 183 or by the pressure sensor 185. If the brake lever 128 is not actuated, then at step 260, the VCU 176 and the BCU 174 operate the electric motor 32 based at least in part on the position of the acceleration lever 140 and then the VCU 176 returns to step 254.

If at step 258 the VCU 176 determines that the brake lever 128 is actuated (i.e. the brake lever 128 and the acceleration lever 140 are actuated simultaneously), the VCU 176 ignores the signal from the acceleration lever position sensor 181 and interrupts operation of the electric motor 32 at step 262. At step 264, the brake 122 is hydraulically actuated in response to the actuation of the brake lever 128. Although shown as being after step 262, step 264 could occur before or in parallel with step 262. From step 264, at step 266 the VCU 176 determines if the brake lever 128 continues to be actuated. If it is, the brake 122 continues to be actuated and the operation of the electric motor 32 remains interrupted. If at step 266 the VCU 176 determines that the brake lever 128 has been released, then the VCU 176 returns to step 254.

Figure 11:
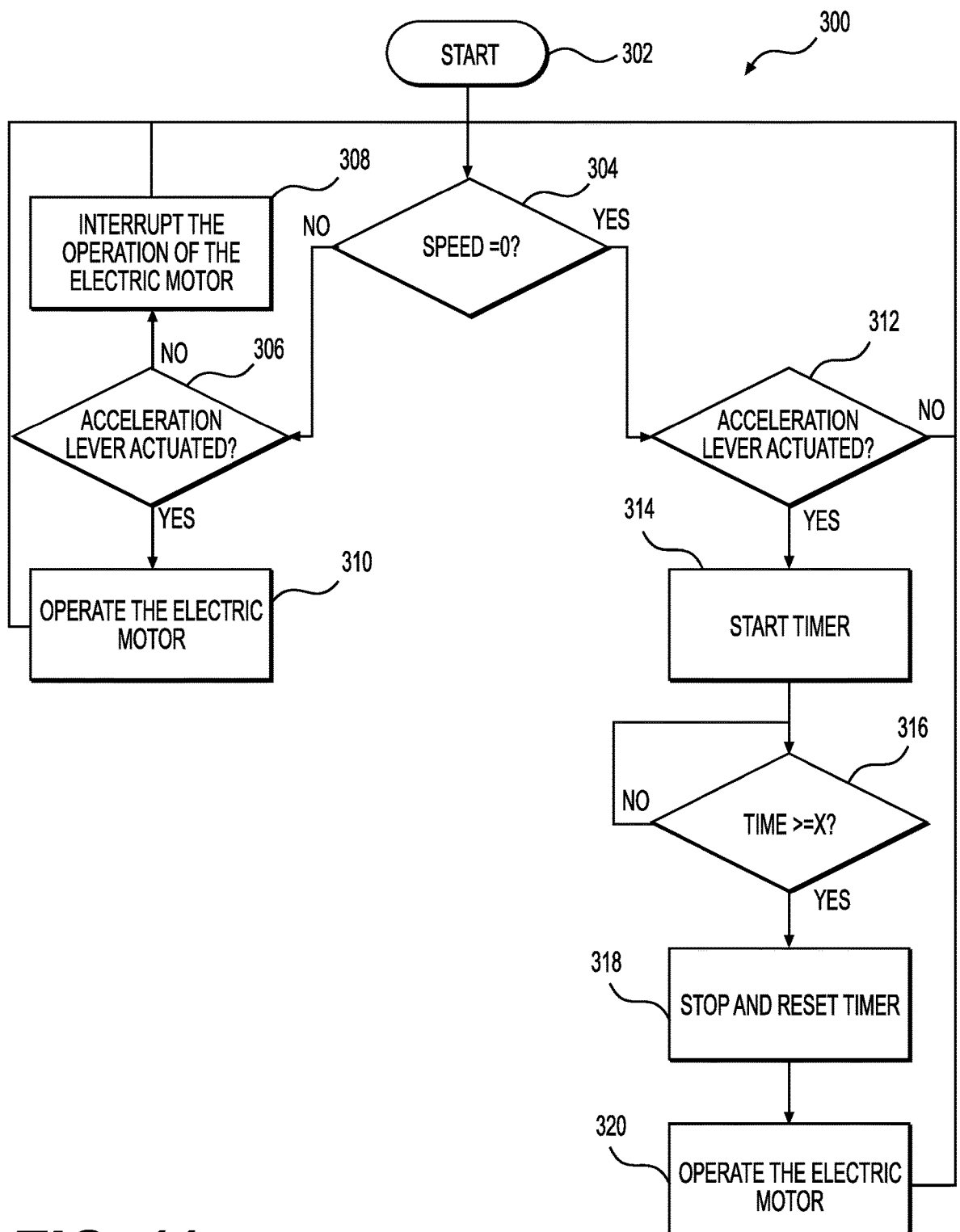
FIG. 11 is a logic diagram illustrating a method for operating an electric vehicle, such as the snowmobile of FIG. 1.

Turning now to FIG. 11, a method 300 for operating the snowmobile 10 will be described. It is contemplated that the method 300 could be used in other types of electric vehicles such as, but not limited to, straddle-type electric all-terrain vehicles (ATVs) and electric motorcycles. Some of these other types of electric vehicles may be provided with a brake pedal and an acceleration pedal or an acceleration twist grip instead of the brake lever 128 and the acceleration lever 140. The method 300 will be described with reference to the brake lever 128 and the acceleration lever 140, but it should be understood that other kinds of brake input devices and acceleration input devices could be used.

The method 300 starts at 302 when the snowmobile 10 is turned on. At step 304, the VCU 176 determines if a speed is equal to zero which is indicative of the snowmobile 10 being at rest. In one embodiment, the speed is the speed of the snowmobile 10 as determined by the vehicle speed sensor 179. In another embodiment, the speed is the speed of the electric motor 32 as determined from the motor speed sensor 177. It is contemplated that the motor speed sensor 177 could not sense the speed of the electric motor 32 directly. For example, the motor speed sensor 177 could sense a speed of rotation of the drive axle 96, and the speed of rotation of the electric motor 32 can be determined since the drive ratio between the electric motor 32 and the drive axle 96 is fixed. It is contemplated that in some embodiments, at step 304 the VCU 176 could determine if both the speed of the snowmobile 10 and the speed of the electric motor 32 are zero for redundancy.

If at step 304 the speed is not zero (i.e. the snowmobile 10 is moving forward or in reverse), then at step 306, the VCU 176 determines if the acceleration lever 140 is actuated based on a signal from the acceleration lever position sensor 181. If the acceleration lever 140 is not actuated, then at step 308 the VCU 176 sends a signal to the BCU 174 to interrupt the operation of the electric motor 32 (unless it was already interrupted) and then the VCU 176 returns to step 304. If at step 306 the VCU 176 determines that the acceleration lever 140 is actuated, then at step 310 the VCU 176 and the BCU 174 operate the electric motor 32 based at least in part on the position of the acceleration lever 140 and then the VCU 176 returns to step 304.

If at step 304 the speed is zero (i.e. the snowmobile 10 is at rest), then at step 312 the VCU 176 determines if the acceleration lever 140 is actuated based on a signal from the acceleration lever position sensor 181. If the acceleration lever 140 is not actuated, then the VCU 176 returns to step 304. If at step 312 the VCU 176 determines that the acceleration lever 140 is actuated, then at step 314 the VCU 176 starts a timer.

Once the timer has been started, at step 316 the VCU 176 determines if a predetermined amount of time X has been reached. In one embodiment, the predetermined amount of time X is 3 seconds, but it is contemplated that it could be more or less (but not zero). If the predetermined amount of time X has not been reached, then VCU 176 will continue to determine if the predetermined amount of time X has been reached. Although not shown, if at any time while step 316 is being performed the acceleration lever 140 is released, the VCU 176 returns to step 304. Once the VCU 176 determines that the predetermined amount of time X has been reached, then at step 318 the VCU 176 stops and resets the timer. Then at step 320 the VCU 176 and the BCU 174 operate the electric motor 32 based at least in part on the position of the acceleration lever 140 and then the VCU 176 returns to step 304.

As a result of the method 300, when the snowmobile 10 is at rest and the acceleration lever 140 is actuated, there will be a delay corresponding to the predetermined amount of time X before the electric motor 32 is powered and the snowmobile 10 starts moving.

Figure 12:
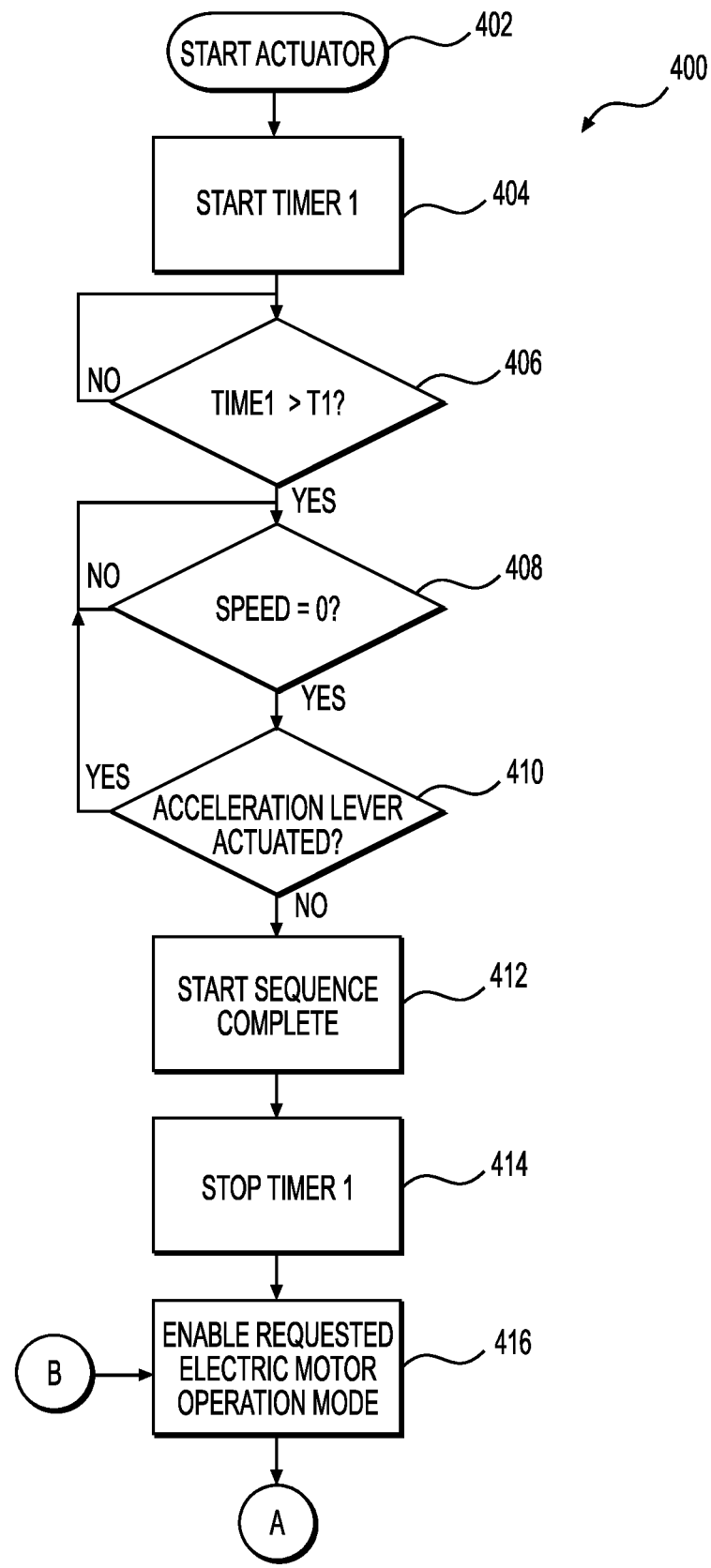
FIGS. 12 to 14 is a logic diagram illustrating an alternative method of operating an electric vehicle such as the snowmobile of FIG. 1.
Figure 13:
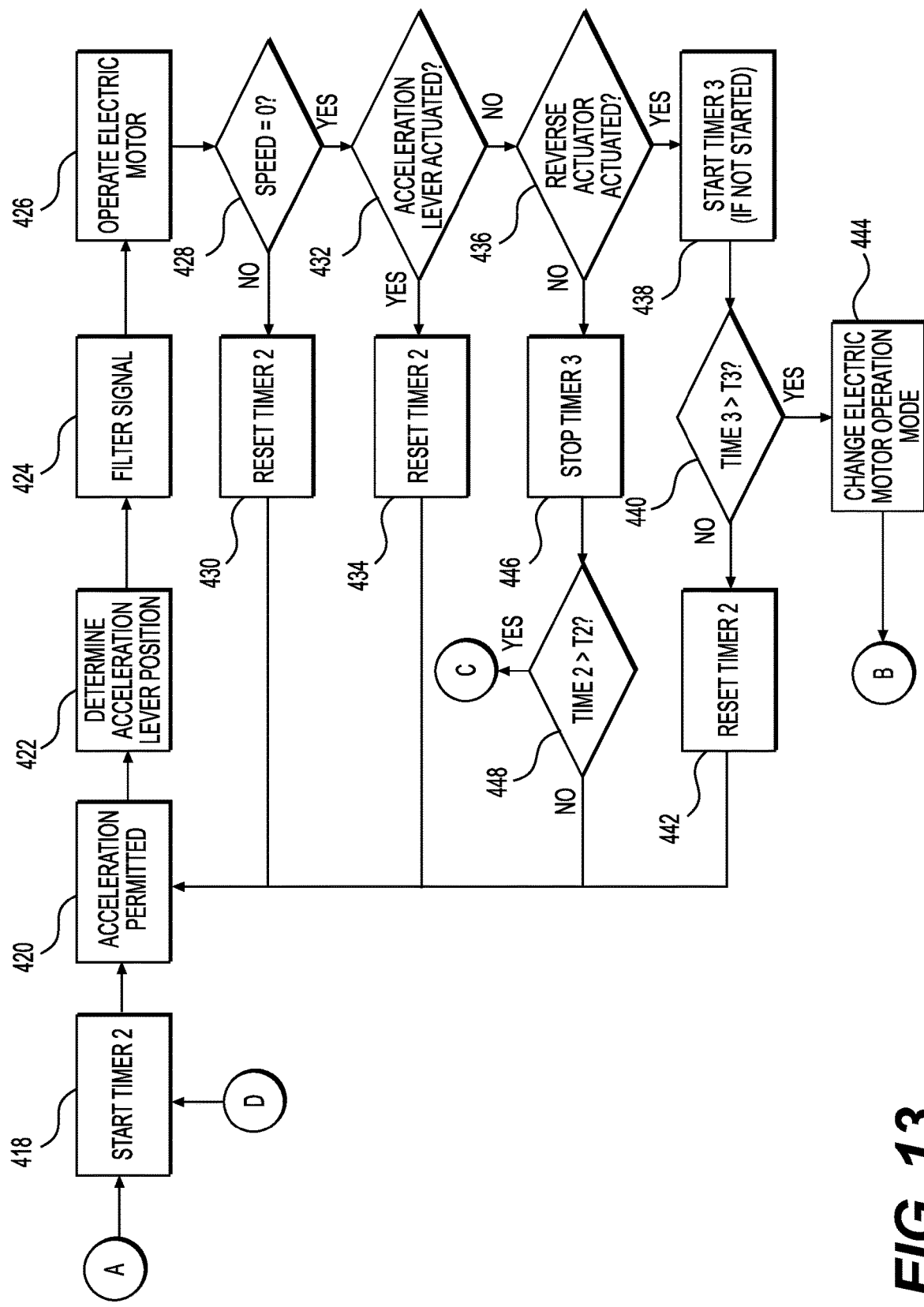
Figure 14:
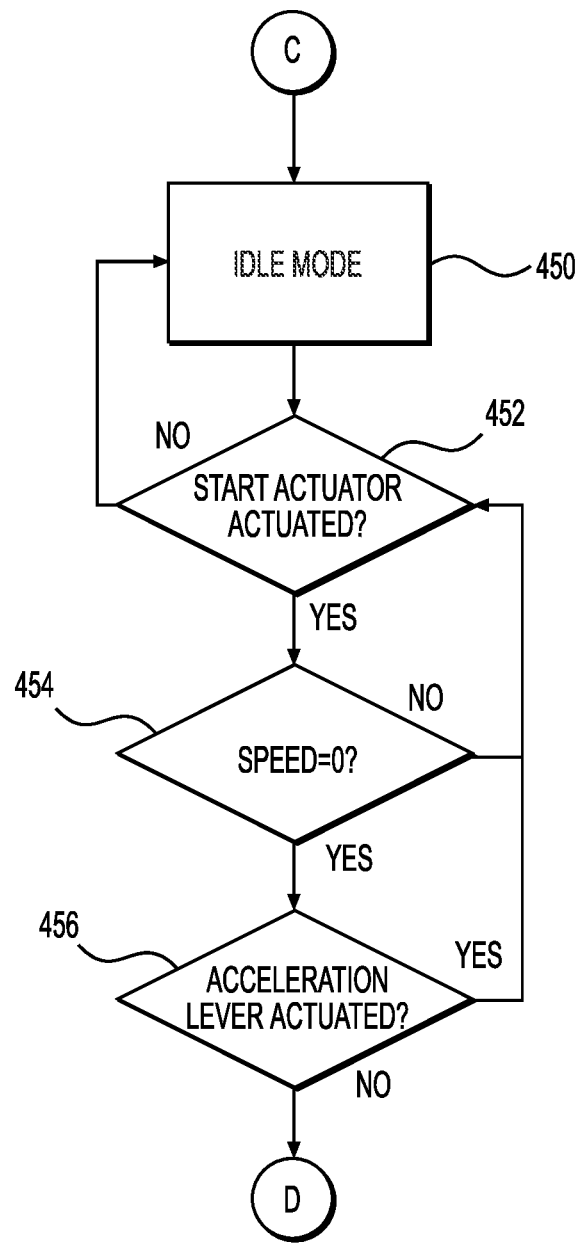

Turning now to FIGS. 12 to 14, a method 400 for operating the snowmobile 10 will be described. It is contemplated that the method 400 could be used in other types of electric vehicles such as, but not limited to, straddle-type electric all-terrain vehicles (ATVs) and electric motorcycles. Some of these other types of electric vehicles may be provided with an acceleration pedal or an acceleration twist grip instead of the acceleration lever 140. The method 400 will be described with reference to the acceleration lever 140, but it should be understood that other kinds of acceleration input devices could be used.

The method 400 starts at 402 when the start actuator 402, in this case the start button 138, is actuated. It is contemplated that in some embodiments, prior to step 402, at least some of the systems of the snowmobile 10 have been turned on when the key 190 is received in the key receiver 188 and the key 190 is recognized by the VCU 176. It is contemplated that in other embodiments, at least some of the systems are turned on once the start actuator 402 is actuated, and the method 400 only proceeds when the key 190 is received in the key receiver 188 and the key 190 is recognized by the VCU 176.

From step 402, at step 404 the VCU 176 starts a timer (Timer 1). Then, at step 406, the VCU 176 determines, based on the timer (Timer 1), if the time (Time 1) elapsed since the timer (Timer 1) has been started at step 404 has reached a predetermined amount of time T1. In one embodiment, the time T1 is 500 milliseconds, but other times are contemplated. If the time (Time 1) has not reached the predetermined amount of time T1, the VCU 176 continues to monitor the time (Time 1) until the predetermined amount of time T1 has been reached. Once the predetermined amount of time T1 has been reached, the VCU 176 proceeds to step 408.

At step 408, the VCU 176 determines if a speed is equal to zero which is indicative of the snowmobile 10 being at rest. In one embodiment, the speed is the speed of the snowmobile 10 as determined by the vehicle speed sensor 179. In another embodiment, the speed is the speed of the electric motor 32 as determined from the motor speed sensor 177. It is contemplated that the motor speed sensor 177 could not sense the speed of the electric motor 32 directly. For example, the motor speed sensor 177 could sense a speed of rotation of the drive axle 96, and the speed of rotation of the electric motor 32 can be determined since the drive ratio between the electric motor 32 and the drive axle 96 is fixed. It is contemplated that in some embodiments, at step 408 the VCU 176 could determine if both the speed of the snowmobile 10 and the speed of the electric motor 32 are zero for redundancy.

If at step 408 the speed is not zero, the VCU 176 continues to monitor the speed until the speed is determined to be zero.

If at step 408 the speed is zero (i.e. the snowmobile 10 is at rest), then at step 410 the VCU 176 determines if the acceleration lever 140 is actuated based on a signal from the acceleration lever position sensor 181. If the acceleration lever 140 is actuated, then the VCU returns to step 408 and continues to monitor the speed (step 408) and the position of the acceleration lever 140 (step 410) until the speed is zero and the acceleration lever 140 is not actuated. It is contemplated that if the speed and the acceleration lever position 140 have been monitored for more than a predetermined amount of time, an indication of an error could be provided to the driver of the snowmobile 10, such as a visual indication on the display cluster 68 and/or by generating a noise. If at step 410 the VCU 176 determines that the acceleration lever 140 is not actuated, then at step 412 the VCU 176 considers that the start sequence has been completed. It is contemplated that at step 412 an indication that the start sequence has been completed could be provided to the driver of the snowmobile 10, such as a visual indication on the display cluster 68 and/or by generating a noise. Then at step 414 the VCU 176 stops the timer (Timer 1). It is contemplated that the order of steps 408 and 410 could be reversed. It is also contemplated that the order to steps 412 and 414 could be reversed.

From step 414, the VCU 176 proceeds to step 416 where the VCU 176 sends a signal to the BCU 174 to enable the requested operation mode of the electric motor 32. When the snowmobile 10 is first started (i.e. the first time step 416 is performed), the requested operation mode is a forward mode (i.e. the electric motor 32 should be turned in a direction that will make the snowmobile 10 move forward). As will be indicated below, the operation mode can be changed to a reverse mode (i.e. the electric motor 32 should be turned in a direction that will make the snowmobile 10 move forward)

From step 416, the VCU 176 proceeds to step 418 (FIG. 13) and starts a timer (Timer 2). The VCU 176 then proceeds to step 420 and enables operation of the electric motor 32 by permitting acceleration. Prior to step 420, actuating the acceleration lever 140 would not result in the operation of the electric motor 32. As would be understood from steps 408 and 410, the operation of the electric motor 32 will not be enabled at step 420 unless the speed is zero and the acceleration lever 140 is not actuated at steps 408 and 410.

Then at step 422, the VCU 176 determines the position of the acceleration lever 140 based on a signal from the acceleration lever position sensor 181. Then at step 424, the VCU 176 uses a signal filter to filter the signal from the acceleration lever position sensor 181 to obtain a filtered signal. In the present embodiment, the signal from the acceleration lever position sensor 181 is filtered using a digital filter to enable filtering of unintended variations in the position of the acceleration lever 140. More specifically, the digital filter enables control of unintended signal activation by way of a controlled disconnect between the true position of the acceleration lever 140 and normal response of the electric motor 32. It is contemplated that other kinds of signal filters to could be used. It is contemplated that other steps described in the present application which determine the position of the acceleration lever 140 could be followed by a filtering step similar to step 424.

From step 424, the VCU 176 proceeds to step 426. At step 426, the VCU 176 and the BCU 174 operate the electric motor 32 based at least in part on the filtered signal of step 424 indicative of the position of the acceleration lever 140 and the operation mode enabled at step 416.

From step 426, the VCU 426 proceeds to step 428. At step 428, the VCU 176 determines if a speed is equal to zero which is indicative of the snowmobile 10 being at rest. In one embodiment, the speed is the speed of the snowmobile 10 as determined by the vehicle speed sensor 179. In another embodiment, the speed is the speed of the electric motor 32 as determined from the motor speed sensor 177. It is contemplated that in some embodiments, at step 428 the VCU 176 could determine if both the speed of the snowmobile 10 and the speed of the electric motor 32 are zero for redundancy.

If at step 428 the speed is not zero, the VCU 176 proceeds to step 430 and resets the timer (Timer 2). From step 430, the VCU 176 returns to step 420.

If at step 428 the speed is zero (i.e. the snowmobile 10 is at rest), then at step 432 the VCU 176 determines if the acceleration lever 140 is actuated based on a signal from the acceleration lever position sensor 181. If the acceleration lever 140 is actuated, then the VCU 176 proceeds to step 434 and resets the timer (Timer 2). From step 434, the VCU 176 returns to step 420.

If at step 432 the VCU 176 determines that the acceleration lever 140 is not actuated, then at step 436 the VCU 176 determines if the reverse actuator, in this embodiment the reverse button 138, is actuated. If the reverse button 138 is actuated, then at step 438 the VCU 176 starts a timer (Timer 3) if the timer has not been started or is stopped. Then at step 440, the VCU 176 determines, based on the timer (Timer 3), if the time (Time 3) elapsed since the timer (Timer 3) has been started at step 438 has reached a predetermined amount of time T3. In one embodiment, the time T3 is 2 seconds, but other times are contemplated. If the time (Time 3) has not reached the predetermined amount of time T3, the VCU 176 proceeds to step 442 and resets the timer (Timer 2). From step 442, the VCU 176 returns to step 420. If at step 440 the predetermined amount of time T3 has been reached, the VCU 176 proceeds to step 444.

At step 444, in response to the reverse button 138 being actuated without interruption for the predetermined amount of time T3, the VCU 176 sends a signal to the BCU 174 to change the operation mode of the electric motor 32. If at step 444 the operation mode was the forward mode prior to the reverse button 138 being actuated at step 436, the operation mode is changed to the reverse mode. If at step 444 the operation mode was the reverse mode prior to the reverse button 138 being actuated at step 436, the operation mode is changed to the forward mode. It is contemplated that at step 444 an indication that the operation mode has been changed could be provided to the driver of the snowmobile 10, such as a visual indication on the display cluster 68 and/or by generating a noise. It is contemplated that the indication to the driver could be different depending on the one of the forward mode and the reverse mode that is now the operation mode of the electric motor 32. From step 444, the VCU 176 proceeds to step 416 (FIG. 12).

If at step 436, the reverse button 138 is not actuated, then at step 446 the VCU 176 stops and resets the timer (Timer 3). Then at step 448, the VCU 176 determines, based on the timer (Timer 2), if the time (Time 2) has reached a predetermined amount of time T2. The predetermined amount of time T2 is greater than the predetermined amount of time T3. In one embodiment, the time T2 is 5 minutes, but other times are contemplated. If the time (Time 2) has not reached the predetermined amount of time T2, the VCU 176 returns to step 420. If at step 448 the predetermined amount of time T2 has been reached, the VCU 176 proceeds to step 450 (FIG. 14).

At step 450, the VCU 176 enters an idle mode. Upon entering the idle mode, acceleration is no longer permitted and actuating the acceleration lever 140 does not operate the electric motor 32. In the idle mode, the batteries 152, 154 and other electrical and electronic components remain turned on. As would be understood from steps 428, 432, 436 and 448, the VCU 176 will not enter the idle mode at step 450 unless the speed is zero, the acceleration lever 140 is not actuated, and the reverse button 38 is not actuated at steps 428, 432 and 436 for the predetermined amount of time T2 (step 448). It is contemplated that at step 450 an indication that the idle mode has been entered could be provided to the driver of the snowmobile 10, such as a visual indication on the display cluster 68 and/or by generating a noise.

From step 450, at step 452 the VCU 176 determines if the start button 138 is actuated. If at step 452 the start button 138 returns to step 450 and stays in the idle mode. If at step 452 the start button 138 is actuated, the VCU 176 proceeds to step 454.

At step 454, the VCU 176 determines if a speed is equal to zero which is indicative of the snowmobile 10 being at rest. In one embodiment, the speed is the speed of the snowmobile 10 as determined by the vehicle speed sensor 179. In another embodiment, the speed is the speed of the electric motor 32 as determined from the motor speed sensor 177. It is contemplated that in some embodiments, at step 408 the VCU 176 could determine if both the speed of the snowmobile 10 and the speed of the electric motor 32 are zero for redundancy.

If at step 454 the speed is not zero, the VCU 176 returns to step 452.

If at step 454 the speed is zero (i.e. the snowmobile 10 is at rest), then at step 456 the VCU 176 determines if the acceleration lever 140 is actuated based on a signal from the acceleration lever position sensor 181. If the acceleration lever 140 is actuated, then the VCU returns to step 452. It is contemplated that if the speed and the acceleration lever position 140 have been monitored for more than a predetermined amount of time, an indication of an error could be provided to the driver of the snowmobile 10, such as a visual indication on the display cluster 68 and/or by generating a noise. If at step 456 the VCU 176 determines that the acceleration lever 140 is not actuated, then the VCU 176 returns to step 418 (FIG. 13) to start and reset the timer (Timer 2) again. It is contemplated that the order of steps 452 and 454 could be reversed.

Figure 15:
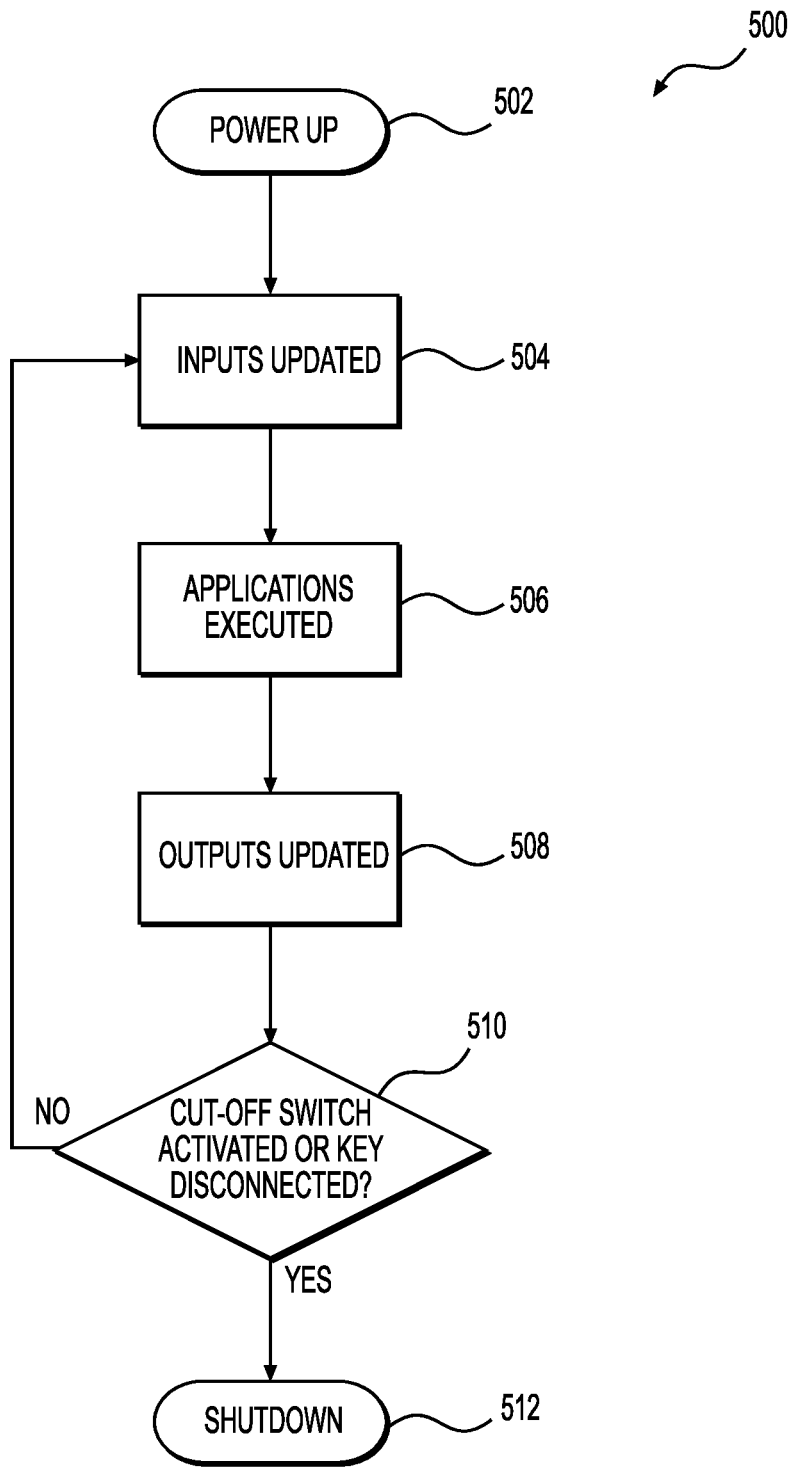
FIG. 15 is a logic diagram illustrating a program execution sequence of the method of FIGS. 12 to 14.

Turning now to FIG. 15, a program execution sequence 500 of the method 400 of FIGS. 12 to 14 will be described. While the method 400 is being performed (i.e. the various systems of the snowmobile 10 are powered-up (step 502)), according to the program execution sequence 500, for each of the applications that have to be executed by the VCU 176 and the BCU 174, the inputs of the applications are updated (step 504), then the applications are executed (step 506), and then the outputs are updated (step 508). The at step 510, the VCU 176 determines if the motor cut-off switch has been activated or if the security system key 190 has been disconnected from the key receiver 188. If not, then the VCU returns to step 504. If at step 510, the motor cut-off switch has been activated or the security system key 190 has been disconnected from the key receiver 188, then at step 512, the VCU 176 initiates a shutdown sequence. The shutdown sequence includes stopping the operation of the electric motor 32 and stopping the supply of power from the batteries 152, 154. As such, according to the program execution sequence, should the motor cut-off switch be activated or the security system key 190 be disconnected from the key receiver 188 at any time during the performance of the method 400, the VCU 176 will initiate the shutdown sequence 512, but only once the outputs of the application that are being executed (step 506) have been updated (step 508). It is contemplated other program execution sequences could be used.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method for operating an electric vehicle comprising:
    determining if at least one of a speed of the vehicle and a speed of an electric motor of the vehicle is zero;
    in response to the at least one of the speed of the vehicle and the speed of the electric motor being zero, determining if a reverse actuator is actuated, the reverse actuator being mounted to a first handle of a handlebar of the vehicle;
    in response to the reverse actuator being actuated, starting a timer;

once the timer has started, determining if the reverse actuator has been actuated without interruption for a predetermined amount of time determined by the timer;

in response to the reverse actuator having been actuated without interruption for the predetermined amount of time, changing an operation mode of the electric motor, the operation mode being one of a forward mode and a reverse mode, changing the operation mode of the electric motor comprising:

changing from the forward mode to the reverse mode, in response to the motor being in the forward mode prior to the reverse actuator being actuated; and changing from the reverse mode to the forward mode, in response to the motor being in the reverse mode prior to the reverse actuator being actuated;

after changing the operation mode, actuating an acceleration input device, the acceleration input device being an acceleration lever mounted to a second handle of the handlebar of the vehicle; and in response to actuating the acceleration input device, operating the electric motor in the operation mode.

2. The method of claim 1, further comprising:

in response to the at least one of the speed of the vehicle and the speed of the electric motor being zero, and prior to determining if the reverse actuator is actuated:

determining if the acceleration input device is actuated; and wherein determining if the reverse actuator is actuated is performed in response to the acceleration input device not being actuated.

3. The method of claim 2, wherein the predetermined amount of time is a first predetermined amount of time;

further comprising entering an idle mode in response to:

the at least one of the speed of the vehicle and the speed of the electric motor being zero, the acceleration input device not being actuated, and the reverse actuator not being actuated, for a second predetermined amount of time, the second predetermined amount of time being greater than the first predetermined amount of time.

4. The method of claim 1, wherein the reverse actuator is a button.

5. The method of claim 1, wherein operating the electric motor in the operation mode in response to actuating the acceleration input device comprises:

determining a position of the acceleration input device using a sensor;

filtering a signal from the sensor to obtain a filtered signal; and operating the electric motor in the operation mode based on the filtered signal.

6. The method of claim 5, wherein filtering the signal comprises using a digital filter to enable filtering of unintended variations in the position of the acceleration input device.

7. The method of claim 1, wherein the at least one of the speed of the vehicle and the speed of the electric motor being zero is the speed of the electric motor being zero.

8. A method for operating an electric vehicle comprising:

actuating a start actuator, the start actuator being mounted to a handlebar of the vehicle;

in response to the start actuator being actuated, starting a timer;

once the timer has reached a predetermined amount of time:

determining if at least one of a speed of the vehicle and a speed of an electric motor of the vehicle is zero; and determining if an acceleration input device is actuated, the acceleration input device being an acceleration lever mounted to the handlebar of the vehicle;

enabling operation of the electric motor in response to:

the at least one of the speed of the vehicle and the speed of the electric motor being zero; and the acceleration input device not being actuated;

operation of the electric motor not being enabled unless:

the at least one of the speed of the vehicle and the speed of the electric motor is zero; and the acceleration input device is not actuated;

in response to the operation of the electric motor being enabled, operating the electric motor in response to actuation of the acceleration input device.

9. The method of claim 8, wherein operating the electric motor in response to actuation of the acceleration input device comprises:

determining a position of the acceleration input device using a sensor;

filtering a signal from the sensor to obtain a filtered signal; and operating the electric motor based on the filtered signal.

10. The method of claim 9, wherein filtering the signal comprises using a digital filter to enable filtering of unintended variations in the position of the acceleration input device.

11. The method of claim 8, wherein the at least one of the speed of the vehicle and the speed of the electric motor being zero is the speed of the electric motor being zero.

* * * * *